United States Patent
Davydov et al.

(10) Patent No.: US 9,654,313 B2
(45) Date of Patent: May 16, 2017

(54) WIRELESS INTERFERENCE MITIGATION

(71) Applicants: Alexei Davydov, Nizhny Novgorod (RU); Seunghee Han, Cupertino, CA (US); Gregory Morozov, Nizhny Novgorod (RU); Alexander Maltsev, Nizhny Novgorod (RU); Vadim Sergeyev, Nizhny Novgorod (RU)

(72) Inventors: Alexei Davydov, Nizhny Novgorod (RU); Seunghee Han, Cupertino, CA (US); Gregory Morozov, Nizhny Novgorod (RU); Alexander Maltsev, Nizhny Novgorod (RU); Vadim Sergeyev, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/440,335

(22) PCT Filed: Dec. 3, 2013

(86) PCT No.: PCT/US2013/072868
§ 371 (c)(1),
(2) Date: May 1, 2015

(87) PCT Pub. No.: WO2014/089075
PCT Pub. Date: Jun. 12, 2014

(65) Prior Publication Data
US 2015/0303958 A1    Oct. 22, 2015

Related U.S. Application Data

(60) Provisional application No. 61/732,851, filed on Dec. 3, 2012.

(51) Int. Cl.
*H04L 25/03* (2006.01)
*H04W 72/12* (2009.01)
(Continued)

(52) U.S. Cl.
CPC ..... *H04L 25/03305* (2013.01); *H04B 1/3827* (2013.01); *H04B 7/0452* (2013.01);
(Continued)

(58) Field of Classification Search
CPC . H04L 27/2647; H04L 5/0007; H04L 1/0054; H04L 25/03286; H04L 25/03331;
(Continued)

(56) References Cited

U.S. PATENT DOCUMENTS

| | | | |
|---|---|---|---|
| 7,995,686 B2 * | 8/2011 | Chang | H04J 11/003 370/203 |
| 2002/0154704 A1 * | 10/2002 | Reshef | H04L 1/0054 375/262 |

(Continued)

FOREIGN PATENT DOCUMENTS

| | | |
|---|---|---|
| WO | WO2009-099472 A2 | 8/2009 |
| WO | WO2011-056607 A1 | 5/2011 |
| WO | WO2012-148207 A2 | 11/2012 |

OTHER PUBLICATIONS

International Search Report and Written Opinion mailed Mar. 27, 2014 from International Application No. PCT/US2013/072868.
(Continued)

*Primary Examiner* — Vineeta Panwalkar
(74) *Attorney, Agent, or Firm* — Schwabe, Williamson & Wyatt, P.C.

(57) ABSTRACT

Embodiments relate to apparatus for wireless interference mitigation within a first User Equipment (UE). The apparatus comprises at least one channel estimator for estimating a first channel transfer function associated with a first received signal designated for the first UE, and for estimating a second channel transfer function associated with a second received, interference, signal. A symbol estimator is responsive to the at least one channel estimator to process at
(Continued)

least the first received signal to produce a symbol estimation. A demodulator, which is responsive to the channel estimator, demodulates the symbol estimation to an output representing a received data unit corresponding to the symbol estimation. The demodulator has a processing unit arranged to demodulate the symbol estimation using the first channel transfer function, the second channel transfer function and a respective modulation scheme for at least the first received signal.

14 Claims, 16 Drawing Sheets

(51) Int. Cl.

| | |
|---|---|
| H04B 1/3827 | (2015.01) |
| H04W 84/18 | (2009.01) |
| H04W 92/18 | (2009.01) |
| H04W 72/04 | (2009.01) |
| H04L 5/00 | (2006.01) |
| H04W 36/10 | (2009.01) |
| H04W 52/40 | (2009.01) |
| H04W 76/04 | (2009.01) |
| H04J 11/00 | (2006.01) |
| H04W 72/08 | (2009.01) |
| H04W 76/02 | (2009.01) |
| H04W 52/02 | (2009.01) |
| H04L 1/00 | (2006.01) |
| H04W 24/02 | (2009.01) |
| H04L 25/02 | (2006.01) |
| H04B 7/0452 | (2017.01) |
| H04B 7/06 | (2006.01) |
| H04B 7/155 | (2006.01) |
| H04L 1/18 | (2006.01) |
| H04W 84/04 | (2009.01) |
| H04L 27/00 | (2006.01) |

(52) U.S. Cl.
CPC ....... *H04B 7/0617* (2013.01); *H04B 7/15557* (2013.01); *H04J 11/005* (2013.01); *H04J 11/0053* (2013.01); *H04L 1/0003* (2013.01); *H04L 1/0054* (2013.01); *H04L 1/1854* (2013.01); *H04L 1/1867* (2013.01); *H04L 5/0007* (2013.01); *H04L 5/0048* (2013.01); *H04L 5/0053* (2013.01); *H04L 5/0055* (2013.01); *H04L 5/0057* (2013.01); *H04L 5/0058* (2013.01); *H04L 5/0092* (2013.01); *H04L 25/0202* (2013.01); *H04L 25/0206* (2013.01); *H04W 24/02* (2013.01); *H04W 36/10* (2013.01); *H04W 52/0261* (2013.01); *H04W 52/40* (2013.01); *H04W 72/042* (2013.01); *H04W 72/0406* (2013.01); *H04W 72/048* (2013.01); *H04W 72/0486* (2013.01); *H04W 72/08* (2013.01); *H04W 72/082* (2013.01); *H04W 72/12* (2013.01); *H04W 72/121* (2013.01); *H04W 72/1242* (2013.01); *H04W 72/1247* (2013.01); *H04W 76/023* (2013.01); *H04W 76/046* (2013.01); *H04W 76/048* (2013.01); *H04W 84/18* (2013.01); *H04W 92/18* (2013.01); *H04L 27/0008* (2013.01); *H04W 72/1205* (2013.01); *H04W 84/042* (2013.01); *Y02B 60/50* (2013.01)

(58) Field of Classification Search
CPC ... H04L 27/2675; H04L 5/0048; H04L 5/005; H04L 1/0026; H04L 5/0073; H04L 5/0051; H04L 5/0037; H04L 25/0202; H04L 5/0053; H04L 5/0057; H04L 25/03305; H04B 1/7105; H04B 1/715; H04B 7/0452; H04B 15/00; H04B 1/7103; H04B 2201/70702; H04J 11/00; H04J 11/005; H04J 11/0053; H04J 11/0023; H04W 72/042; H04W 72/082
See application file for complete search history.

(56) References Cited

U.S. PATENT DOCUMENTS

| | | | | |
|---|---|---|---|---|
| 2007/0147527 | A1* | 6/2007 | Egashira | H04L 5/0023 375/260 |
| 2009/0046582 | A1* | 2/2009 | Sarkar | H04B 7/043 370/230.1 |
| 2010/0309861 | A1* | 12/2010 | Gorokhov | H04B 1/7103 370/329 |
| 2012/0008582 | A1 | 1/2012 | Gerlach | |
| 2012/0184206 | A1 | 7/2012 | Kim et al. | |
| 2013/0003639 | A1* | 1/2013 | Noh | H04L 5/0053 370/312 |
| 2013/0034064 | A1* | 2/2013 | Nam | H04W 72/1294 370/329 |
| 2013/0114496 | A1* | 5/2013 | Mazzarese | H04L 5/0023 370/312 |
| 2014/0086176 | A1* | 3/2014 | Liu | H04W 74/006 370/329 |

OTHER PUBLICATIONS

ETSI TS 136 211 V11.0.0 (Oct. 2012); Evolved Universal Terrestrial Radio Access (E-UTRA); Physical channels and modulation (3GPP TS 36.211 version 11.0.0 Release 11); 108 pages.
ETSI TS 136 212 V11.0.0 (Oct. 2012); Evolved Universal Terrestrial Radio Access (E-UTRA); Multiplexing and channel coding (3GPP TS 36.212 version 11.0.0 Release 11); 81 pages.
ETSI TS 136 213 V11.0.0 (Oct. 2012); Evolved Universal Terrestrial Radio Access (E-UTRA); Physical layer procedures (3GPP TS 36.213 version 11.0.0 Release 11); 145 pages.

\* cited by examiner

WIRELESS INTERFERENCE MITIGATION

CROSS REFERENCE TO RELATED APPLICATIONS

The present application is a national phase entry under 35 U.S.C. §371 of International Application No. PCT/US2013/072868, filed Dec. 3, 2013, entitled "WIRELESS INTERFERENCE MITIGATION", which designates the United States of America, which claims priority to U.S. Patent Application No. 61/732,851, filed Dec. 3, 2012, entitled "ADVANCED WIRELESS COMMUNICATION SYSTEMS AND TECHNIQUES." The entire disclosures of which are hereby incorporated by reference in their entireties for all purposes, except for those sections, if any, that are inconsistent with this specification.

TECHNICAL FIELD

Embodiments relate to wireless communications, and more particularly, to interference mitigation in wireless communications.

BACKGROUND

As advances in wireless communication technology progress, it is desirable to improve the capacity of LTE-A networks by deploying heterogeneous networks to achieve cell-splitting gains and Multi-User Multiple-Input Multiple-Output (MU-MIMO). It is expected that co-channel interference originating from either inter-cell or co-scheduled intra-cell users can be a factor in achieving higher network capacity.

It is known to implement interference mitigation at the network side, for example, at the transmitting base station, by employing coordinated multi-point techniques (CoMP). These CoMP techniques involve base transceiver stations being coordinated such that base transceiver stations from multiple cells can transmit signals to the UE and receive signals from the UE with reduced interference.

However, interference may occur at a User Equipment (UE) when the UE experiences, for example, co-channel interference originating from either inter-cell communication to the UE or co-scheduled intra-cell communications to the UE; both of which can limit performance.

BRIEF DESCRIPTION OF THE DRAWINGS

Embodiments described herein are illustrated, without limitation, by way of example, in the accompanying drawings.

DESCRIPTION OF EMBODIMENTS

Figure 1A:
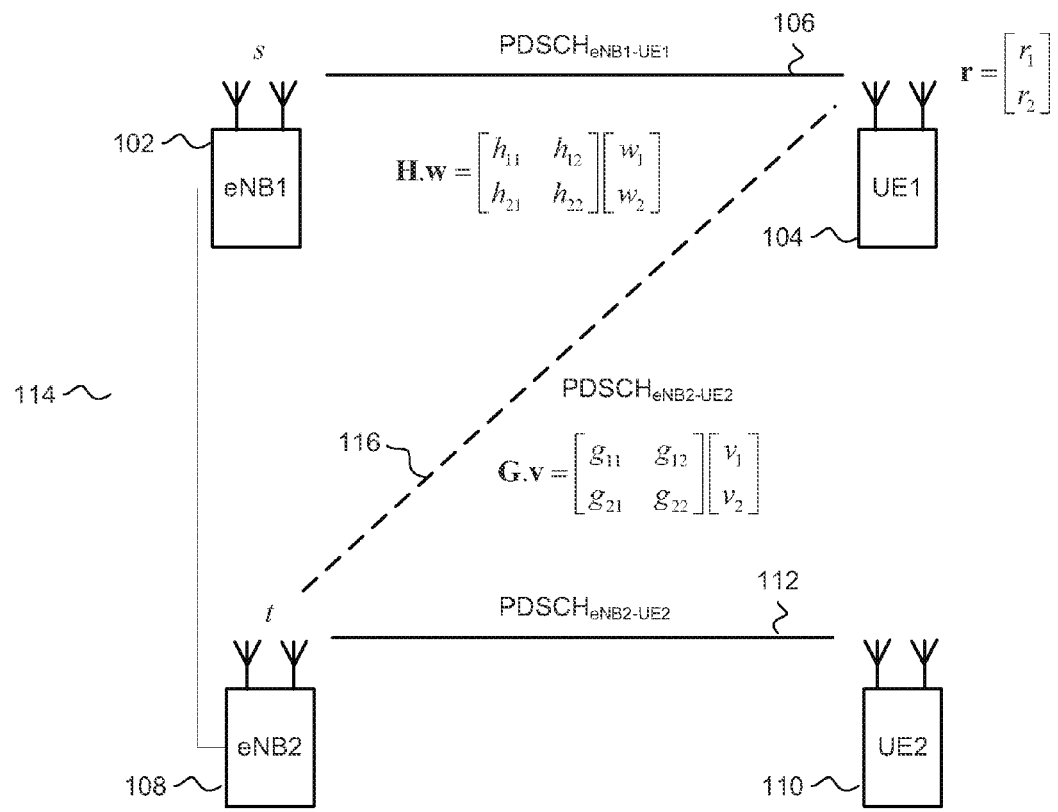
FIGS. 1A and B show interference scenarios.

FIG. 1 shows a view 100 that illustrates inter-cell interference. A first eNode B (eNB) 102 is communicating with a first UE 104 via a respective first signal carried by a first channel 106. Embodiments are provided in which the respective first channel is a Physical Downlink Shared Channel (PDSCH) 106. A second eNB 108 is communicating with a second UE 110 via a respective second signal carried by a respective second channel 112. For example, the respective second channel can be a PDSCH.

The first 102 and second 108 eNBs can be configured to communicate control information to each. The control information can be communicated via a backhaul link 114, which connects them directly or via an intermediary such as, for example, a network entity (not shown). Also shown is an interfering channel 116 emanating from the second eNB 108 that is also being received by the first UE 104.

In general, a wireless system in which an eNB uses two transmit antennas to send a single spatial layer to a UE with two receive antennas, the equivalent channel, which is the channel transfer function of the channel, after beam-forming, between the first eNB 102 and the first UE 104, on a given resource element (RE), can be expressed as a product of an intended channel transfer function, $$H = \begin{bmatrix} h_{11} & h_{12} \\ h_{21} & h_{22} \end{bmatrix},$$

and beam-forming vector, $$w = \begin{bmatrix} w_1 \\ w_2 \end{bmatrix},$$

which gives $$H \cdot w = \begin{bmatrix} h_{11} & h_{12} \\ h_{21} & h_{22} \end{bmatrix} \begin{bmatrix} w_1 \\ w_2 \end{bmatrix},$$

where $h_{ij}$ is channel transfer function between i-th receive antenna of UE and j-tx antenna of eNB.

The equivalent channel transfer function of the interfering channel 116 between the second eNB 108 and the first UE 104 can be expressed as product of an interfering channel transfer function, $$G = \begin{bmatrix} g_{11} & g_{12} \\ g_{21} & g_{22} \end{bmatrix},$$

and beam-forming vector, $$v = \begin{bmatrix} v_1 \\ v_2 \end{bmatrix},$$

which gives $$G \cdot v = \begin{bmatrix} g_{11} & g_{12} \\ g_{21} & g_{22} \end{bmatrix} \begin{bmatrix} v_1 \\ v_2 \end{bmatrix},$$

where $g_{ij}$ is channel transfer function between i-th receive antenna of UE and j-tx antenna of eNB.

Therefore, the signal, r, received by the first UE 104 can be expressed as $$r = H \cdot w \cdot s + G \cdot v \cdot t + n = h \cdot s + g \cdot t + n,$$

where $$r = \begin{bmatrix} r_1 \\ r_2 \end{bmatrix}$$

is a vector of received signals on the first and second receive antennas;

h is the equivalent channel of the serving channel;

g is the equivalent channel of the interfering channel;

s is the serving signal;

t is the interfering signal; and $$n = \begin{bmatrix} n_1 \\ n_2 \end{bmatrix}$$

is a vector of thermal noise and residual interference from other sources.

It should be noted that the received signal model with a single spatial stream on serving and interfering eNBs is merely one possible transmission example. Examples are, however, not limited in this respect. Examples can be realised in which the described principles and procedures herein can be extended to other transmission scenarios with more than one signal being transmitted by any eNB.

Figure 1B:
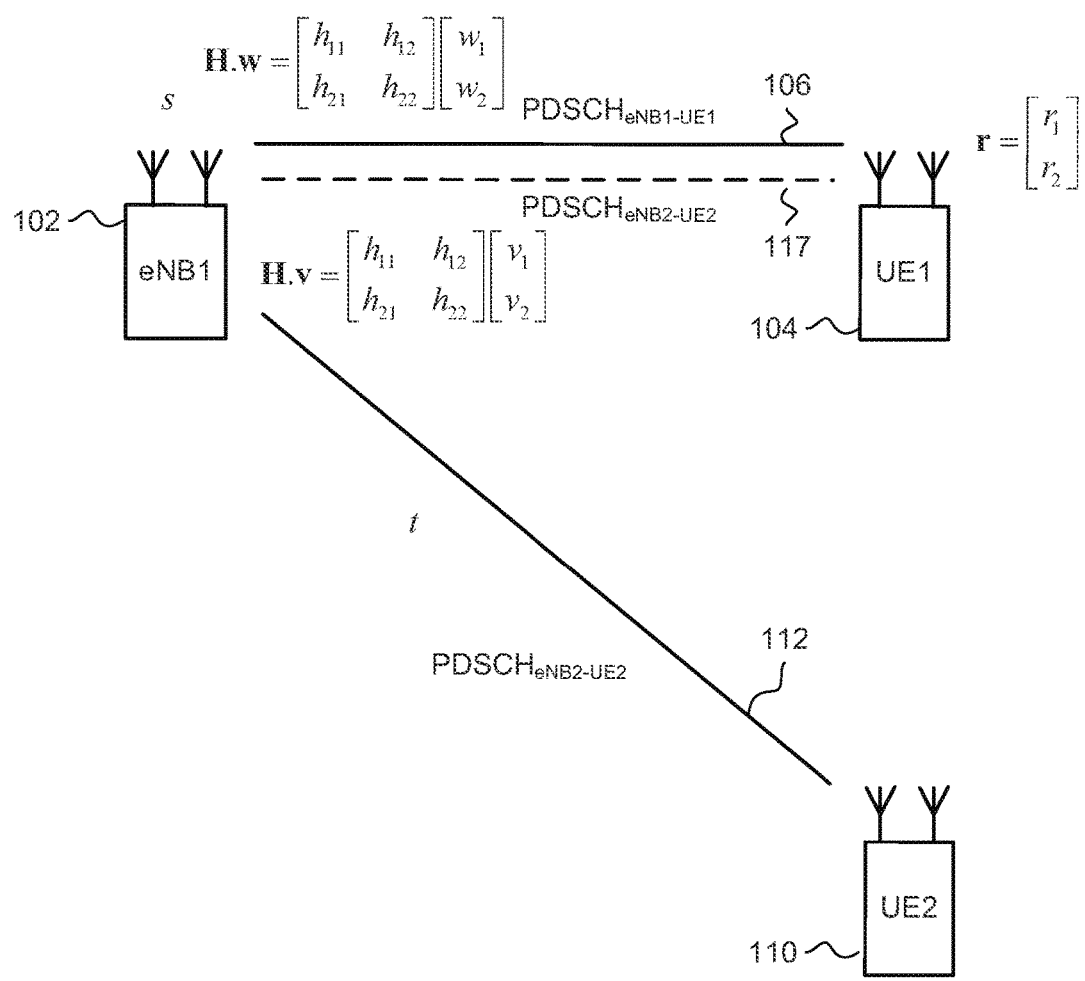

In an intra-cell interference scenario, the interfering signal of the interfering channel 116 would also emanate from the first eNB 102 and still be received by the first UE 104, even though the transmission associated with the interfering signal is intended for the second UE 110. FIG. 1B shows an intra-cell interference scenario 100B. The first eNB 102 transmits signals to both the first 104 and second 110 UEs. The transmissions comprise respective intended signals carried by respective channels 106 and 112 designated for the first and second UE 104 and 110. It can be appreciated that a transmission to the second UE 110 also manifests itself as an interference signal 117 received by the first UE 104. In the present example, the first eNB 102 is also the interfering eNB. It will be appreciated that the equivalent intended channel between the first eNB 102 and the first UE 104 will be as given above, that is, $$H \cdot w = \begin{bmatrix} h_{11} & h_{12} \\ h_{21} & h_{22} \end{bmatrix} \begin{bmatrix} w_1 \\ w_2 \end{bmatrix}.$$

However, the equivalent interference channel between the first eNB 102 and the first UE 104 will be given by $$H \cdot v = \begin{bmatrix} h_{11} & h_{12} \\ h_{21} & h_{22} \end{bmatrix} \begin{bmatrix} v_1 \\ v_2 \end{bmatrix}.$$

Figure 2:
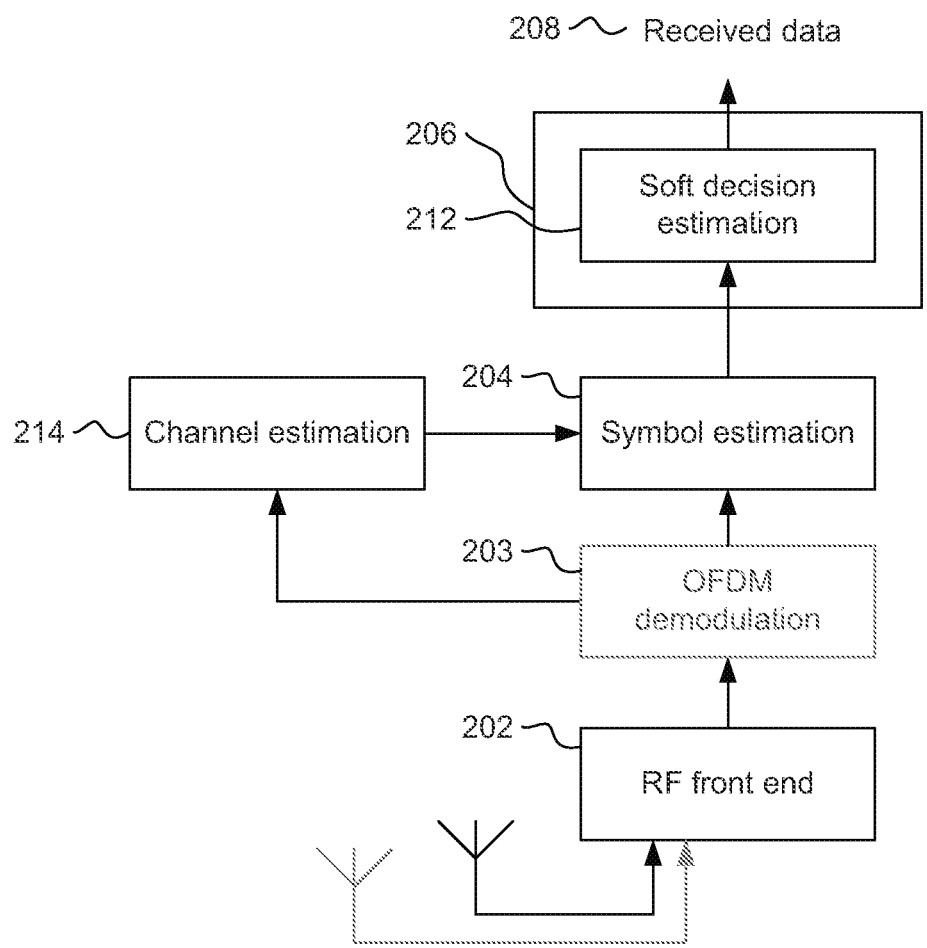
FIG. 2 is depicts part of a User Equipment (UE)

Referring to FIG. 2, there is shown a schematic view 200 of the first UE 104. The first UE 104 comprises an RF front end 202 for receiving one or more than one signal. The received signal or signals can be received via two or more respective antennas. The received signals are passed from the RF front end 202 to an OFDM demodulator 203 and a symbol estimator 204 that provides an estimation of the received signals. Embodiments provide for the symbol estimator 204 to extract the amplitude and phase of the received signals, that is, signals received by the UE, or, viewed another way, signals transmitted by a respective eNB. A demodulator 206 is provided to process the extracted amplitude and phase of any received signals to estimate the value or values of one or more bits represented by the extracted amplitude and phase information, which value or values are output typically as received data units 208 such as, for example, received bits. The demodulator processing can take the form of a soft decision taken by a soft decision estimator 212. A soft decision has an accompanying measure of confidence.

The phase and amplitude of a received signal depends not only on the phase and amplitude of the transmitted signal, but also on the equivalent channel transfer function, that is, equivalent channel. Therefore, the UE 104 also comprises a channel estimator 214. The channel estimator 214 is operable to compensate for phase changes introduced by the intended equivalent channel transfer function, h. The channel estimator 214 processes a reference signal that is inserted into the signal transmitted by the first eNB 102 that is designated for the first UE 104. The reference signal is known to both the eNB 102 and the first UE 104 and has pre-defined amplitudes and phases. The channel estimator 214 of the first UE 104 measures at least one of the amplitude and phase of the received reference signal and compares them with the known version of the expected reference signal to identify any amplitude and/or phase changes introduced by the transfer function of the intended equivalent channel. Any identified amplitude and/or phase changes can then be used to adjust the amplitude and/or phase of symbols estimated by the symbol estimator 204 on the resource elements corresponding to data symbols. An embodiment provides for the reference signal to be a UE-specific Reference Signal or Cell Specific Reference Signal (CRS) that is associated with the Physical Downlink Shared Channel (PDSCH), as can be appreciated from, for example, 3GPP TS 36.211, v11.04.00, or v11.00.00, at section 6.10.3. Embodiments can be realised in which the reference signal is arranged to be received by the UE 104 on one or more selected antenna ports.

Figure 3:
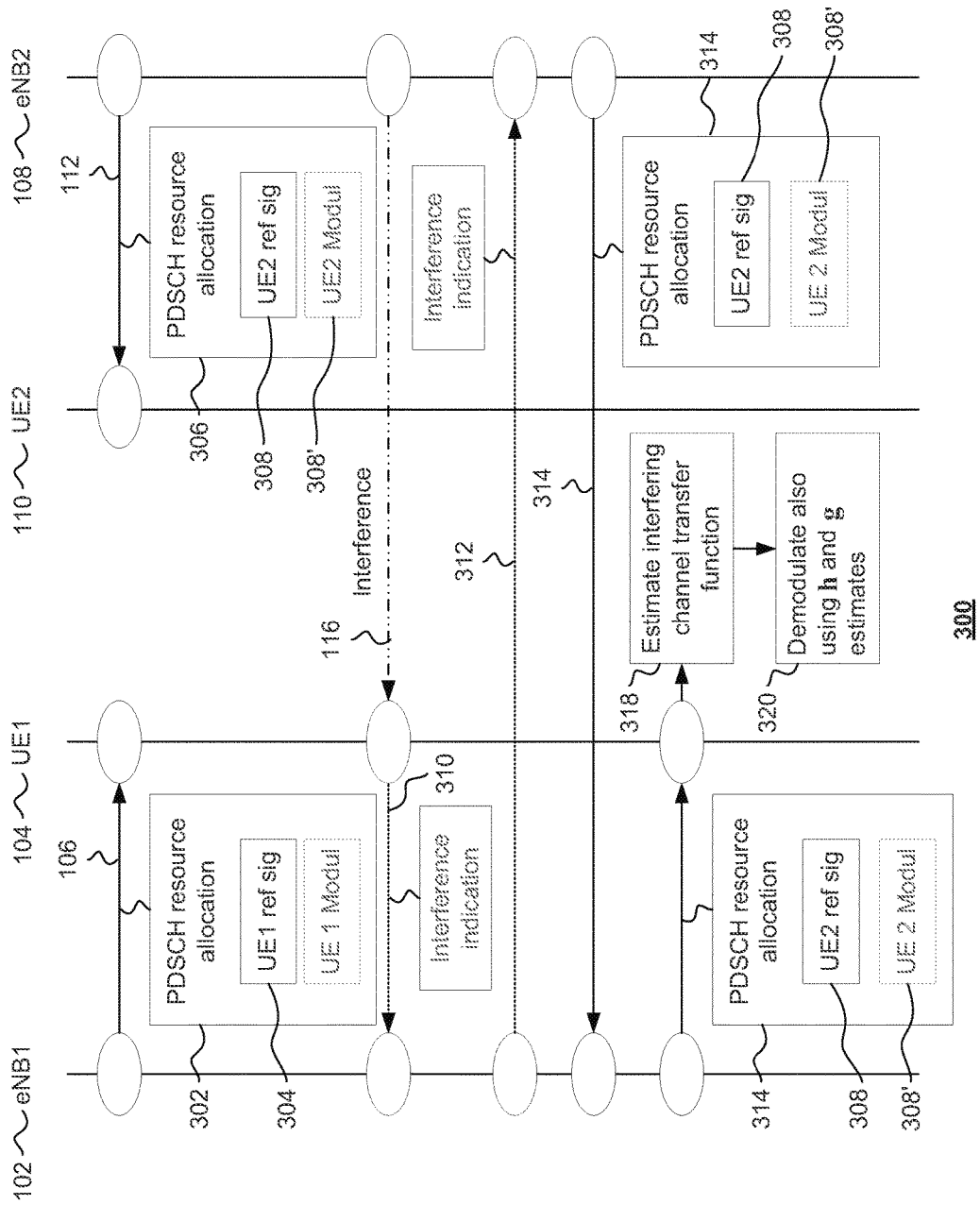
FIG. 3 illustrates a flow diagram of operations associated with interference mitigation.

Referring to FIG. 3, there is shown an example of signaling 300. The first eNB 102 sends data on the PDSCH channel, $PDSCH_{eNB1-UE1}$, 106 to the first UE 104. The resource elements 302 allocated to the first UE1 104 also contain an embodiment of a UE-specific reference signal 304, as prescribed above in section 6.10.3, for use by the first UE 104 in performing channel estimation. In particular, selected antenna ports are used for the resource elements corresponding to the UE-specific reference signal. Examples can be realised in which antenna ports p=7, 8, . . . , v+6, where v is the number of layers used for transmission of the PDSCH. An example can be realised in which the UE-specific reference signal is carried using antenna port 7.

It can be appreciated that the second eNB 108 has established a communication channel 112 with the second UE 110. The PDSCH resource allocation 306 is signaled to the second UE 110 by the second eNB 108. That signaling also contains a respective UE-specific reference signal 308 for the second UE 110 for use in performing channel estimation.

Assume that the first UE 104 is experiencing interference 116 associated with one or more of its resource elements and that the source of interference is the PDSCH$_{eNB2\text{-}UE2}$ 112 associated with the second UE 110 and the second eNB 108. Optionally, the first UE 104 reports the interference to the first eNB 102 via signal 310. The first eNB 102, again optionally, forwards, to the second eNB 108, a notification 312 containing an indication of that interference.

The second eNB 108, either proactively or in response to the above notification, sends to the first eNB 102 interfering signal information associated with the communication 112 between the second eNB 108 and the second UE 110. That information is described below, but can comprise an indication of the resource allocation, in particular, those relating to the UE-specific reference signal 308 associated with the second UE 110, as can be appreciated by signal 314, as well as the modulation scheme 308' used for resource elements of the communication 112.

In some embodiments when the interfering signal corresponds to the CRS based transmission modes, in addition to a modulation scheme 308', beam-forming information v associated with the interfering PDSCH is provided by signal 314. The beam-forming information comprises the precoding matrix indicator (PMI).

The interfering signal information, which is an embodiment of interference mitigation data, is conveyed from the second eNB 108 to the first eNB 102 using the backhaul connection 114 or in some other way such as, for example, by one or more network intermediaries. It will be appreciated that any such indication can comprise, for example, the resource allocation made to the interfering UE identified by the resource allocation field in each of the PDCCH and EPDCCH, which comprises two parts; namely, a resource allocation header field and information consisting of the actual resource block assignment. The resource allocation has three formats. The first is a resource allocation type 0. In resource allocations of type 0, resource block assignment information comprises a bitmap indicating the Resource Block Group (RBGs) that are allocated to the interfering UE, where a RBG is a set of virtual resource blocks (VRBs). The total number of RBGs, $N_{RBG}$, for downlink system bandwidth of $N_{RB}^{DL}$ is given by $N_{RBG}=\lceil N_{RB}^{DL}/P \rceil$ where $N_{RBG}=\lfloor N_{RB}^{DL}/P \rfloor$ are of size P and if $N_{RB}^{DL}$ mod P>0 then one of the RBGs is of size $N_{RB}^{DL}-P\cdot\lfloor N_{RB}^{DL}/P \rfloor$. The bitmap is of size $N_{RBG}$ bits with one bitmap per RBG such that each RBG is addressable. A second format is resource allocation type 1. In resource allocations of type 1, the resource block assignment information consists of three fields. A first field comprises $\lceil \log_2(P) \rceil$ bits to indicate a selected RBG subset from among P RBG subsets. A second field with one bit indicates a shift of resource allocation span within a subset. A bit value of 1 indicates that the shift is in effect. A third field includes a bitmap in which each bit addresses a single VRB in a selected RBG subset in such a way that the most significant to least significant bits of the bitmap are mapped to the VRBs in order of increasing frequency. The VRB is allocated to the interfering UE if the corresponding bit value field is 1, the VRB is not allocated to the interfering UE otherwise. The portion of the bitmap used to address VRBs in a selected RBG subset has a size $N_{RB}^{TYPE1}$ and is defined as $N_{RB}^{TYPE1}=\lceil N_{RB}^{DL}/P \rceil - \lceil \log_2(P) \rceil - 1$. It will be appreciated that the resource allocation type 2 data could also be used. Embodiments can be realised that convey the resource allocation of the interfering UE to the interfered UE in any other way.

The first eNB 102 forwards the PDSCH resource allocation 314, in particular, the PDSCH resource allocation and associated UE-specific reference signal, or data associated with or derived from that allocation, known as interference mitigation data, to the first UE 104, as can be appreciated from signal 316. The first UE 104 uses the resource element allocation to extract the UE-specific reference signal associated with the second UE 110. The first UE 104 uses, at 318, the extracted UE-specific reference signal to perform channel estimation for the interfering equivalent channel transfer function, g, and for demodulation, at 320, of future received signals that takes into account the equivalent transfer function of the intended communication channel and the equivalent transfer function of the interfering communication channel as well as the interference itself.

In some embodiments, when the interfering signal corresponds to CRS based transmission modes, the CRSs of the interfering cell and the received interfering beam-forming vector v is used to perform channel estimation for the interfering equivalent channel transfer function, g, and demodulation, at 320, of future received signals takes into account the equivalent transfer function of the intended communication channel and the equivalent transfer function of the interfering communication channel as well as the interference itself.

An example of the above described demodulator 206 is a maximum likelihood demodulator. A maximum likelihood demodulator or receiver, in general, seeks to find values for received signal estimates, s and t, that minimise $\|r-hs-gt\|^2$, where $\|\cdot\|$ represents a norm, such as, for example, the Frobenius norm. The above demodulator is arranged to perform two channel transfer function estimations; the first being the transfer function of the intended channel, h, and the second being the transfer function of the interfering channel, g.

Figure 4:
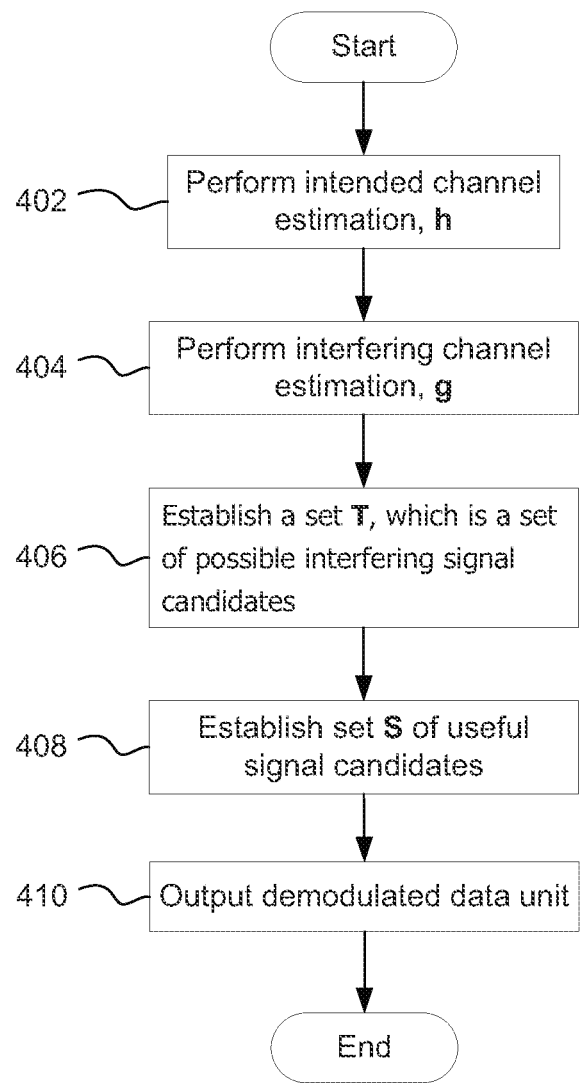
FIG. 4 shows a flowchart of processing operations for demodulating data.

FIG. 4 shows a flowchart 400 of the demodulation. At step 402, a channel estimation is established for the intended communication channel, h, and, at step 404, a channel estimation for the interfering communication channel, g, is established.

At step 406, establish a set $T \in \{t_i\}$, which is a set of possible interfering signal candidates, $t_i$, given the modulation scheme(s) used by the eNB 108 to second UE 110 communication.

For each interfering signal candidate, $t_i$, establish, at step 408, a set S, which is a set of intended or useful signal candidates. The signal $\hat{s}(t_i)$ is an optimal useful signal corresponding to the interfering signal candidate $t_i$ which is selected from the constellation of the intended or useful signal candidates as follows $$\hat{s}(t_i)=\text{slice}\{(h^h h)^{-1} h^h (r-g\cdot t_i)\}$$

where the operation slice { } finds the nearest signal point in a modulation constellation prescribed for the intended communication, that is, prescribed for use by the useful signal. In essence, establishing the $\hat{s}(t_i)$ can comprise evaluating the expression $(h^h h)^{-1} h^h (r-g\cdot t_i)$ for each possible $t_i$, given the modulation scheme associated with each $t_i$, then finding the nearest constellation point of the values of $(h^h h)^{-1} h^h (r-g\cdot t_i)$ from set S for each possible $t_i$ to constellation points of the modulation constellation used by the intended or useful signal; where $h^H$ is the Hermitian of the matrix h, and the superscript "−1" represents the matrix inverse operation.

The maximum likelihood demodulation decision is made at step 410 using the following condition $$s = \underset{t_i \in T}{\operatorname{argmin}} \|r - g \cdot t_i - h\hat{s}(t_i)\|^2$$

where $\|\cdot\|$ represents a norm, such as, for example, the Frobenius norm.

It will be appreciated that the above maximum likelihood demodulator is an example of a possible demodulator. However, other examples could use different techniques such as, for example, a method of maximum aposteriori probability estimation (MAP), sphere decoding, QR-Maximum Likelihood (where QR is a QR decomposition) and the like.

It will be appreciated that the modulation constellations for the PDSCH can be one or more of QPSK, 16QAM and 64 QAM. A prescribed modulation constellation is conveyed to the UE 104 as part of the Physical Downlink Control Channel (PDCCH), more particularly, as part of the Downlink Control Information (DCI), which carries the 5-bit number of the modulation and coding scheme to be used by the PDSCH. In another embodiment for signaling of the modulation order of the interfering signal, 2-bits can be used by the PDCCH. The examples described herein are equally applicable to other control channels such as, for example, the PDCCH and the Enhanced Downlink Physical Control Channel (EDPCCH).

A further example of the above will now be described with reference to FIGS. 5 and 6.

Figure 5:
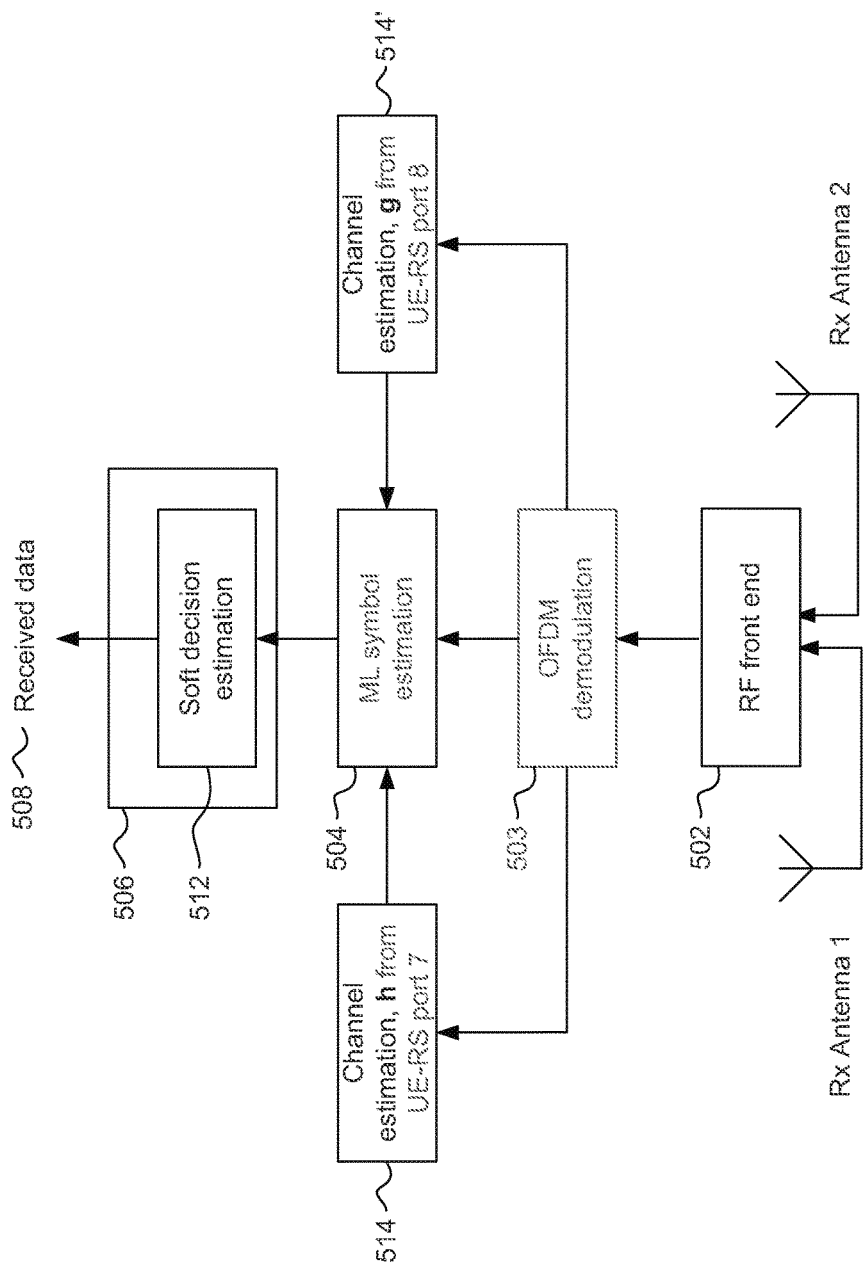
FIG. 5 illustrates a part of a UE.

Referring to FIG. 5, there is shown a schematic view of a UE 500 such as the first UE 104. The UE 500 comprises an RF front end 502 for receiving signals. The received signals can be received via two or more respective antennas associated with antenna ports such as, for example, those prescribed by section 6.10.3, that is, antenna ports p=7, 8, . . . , v+6. The received signals are passed from the RF front end to an OFDM demodulator 503. An ML symbol estimator 504 provides an estimation of current symbols of the received signals. A demodulator 506 is provided to process the estimated signals to estimate their values as one or more data units, such as bits, represented by the extracted amplitude and phase information, which values are output typically as received bits 508. The processing can take the form of a soft decision taken by a soft decision estimator 512.

For the reasons stated above, the UE 500 also comprises at least one channel estimator. In the present example, two channel estimators are provided. A first channel estimator 514 is provided for determining an estimate of the intended communication channel equivalent transfer function, h. A second channel estimator 514' is provided for determining an estimate of an interfering channel equivalent transfer function, g. The channel estimators 514 and 514' are operable to estimate any amplitude and phase changes introduced by the intended equivalent channel transfer function, h, or the interfering equivalent channel transfer function, g.

The channel estimators 514 and 514' process known reference signals that are inserted into the signals transmitted by the first eNB 102 and second eNB 108. In the present example, in processing the UE-specific reference signal associated with another UE, as above, the receiving UE assumes that an intended UE-specific reference signal and an interfering UE-specific reference signals use the same scrambling sequence. In this, case the intended UE-specific reference signal is transmitted on one of the antenna ports, such as, for example, port 7, and an interfering reference signal, is deemed to be available from the other antenna port such as, for example, port 8, or visa-versa. It can be appreciated that the foregoing applies for inter-cell interference, intra-cell interference or both inter and intra cell interference.

The reference signals are known to both the eNB 102 and the first UE 104 and have pre-defined amplitude and phase characteristics. The channel estimators 514 and 514' measure at least one of the amplitude and phase of the received US-specific reference signals and compare them with the known versions of the UE-specific reference signals to identify amplitude and/or phase changes introduced by the intended and interfering channel equivalent transfer functions. Any identified amplitude and/or phase changes can then be used for symbol estimation by the ML symbol estimator 504, which produces a pair of symbols; a useful symbol and an interfering symbol; one per antenna port. An embodiment provides for the reference signals to be a UE-specific Reference Signal that is associated with the Physical Downlink Shared Channel, as can be appreciated from, for example, 3GPP TS 36.211, v11.04.00, or v11.00.00, at section 6.10.3.

Having obtained two symbols, those symbols are processed by the demodulator 506 as indicated above.

Figure 6:
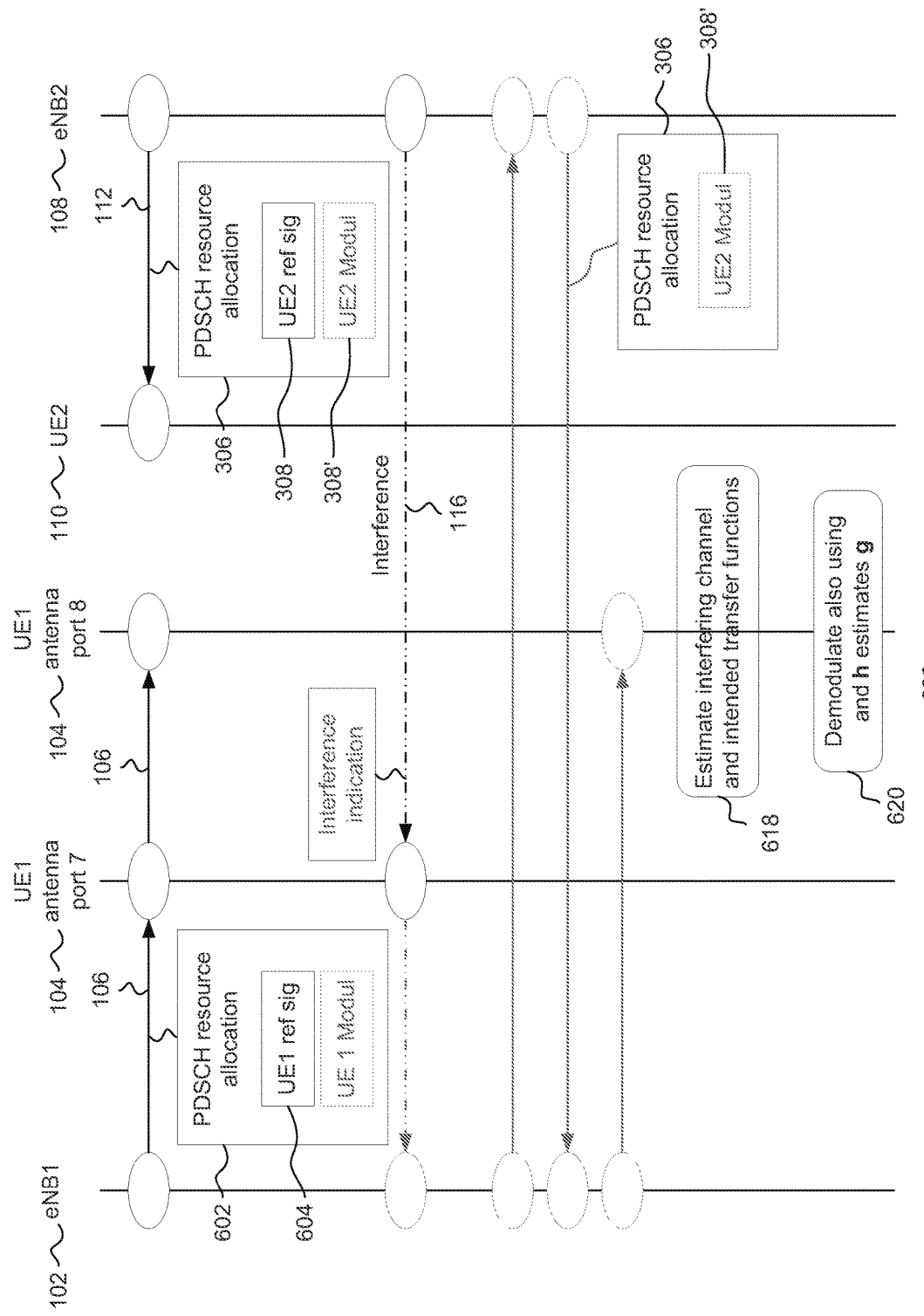
FIG. 6 depicts a flow diagram of processing operations associated with interference mitigation.

Referring to FIG. 6, there is shown an example of a signaling exchange 600. The first eNB 102 sends data on the PDSCH channel, $PDSCH_{eNB1-UE1}$, 106 to the first UE 104. The PDSCH resource allocation and resource elements 602 allocated to the first UE 104 also contain an embodiment of a UE-specific reference signal 604, as prescribed above in section 6.10.3, for use by the first UE 104 in performing channel estimation. In particular, selected antenna ports 7 and 8 are used for the resource elements corresponding to the UE-specific reference signal.

Assume that the first UE 104 is experiencing interference 116. The source of that interference is assumed to be the PDSCH associated with the second UE 110 and UE-specific reference signal with the same scrambling sequence being received on antenna port 8 as can be appreciated from, for example, FIG. 6.10.3.2-3 of the above TS 36.211. It can be appreciated that the second eNB 108 has established a PDSCH with the second UE 110. The PDSCH downlink resource allocation has prescribed a UE reference signal and an indication of the modulation scheme used.

The first UE 104 uses the resource element allocations for antenna ports 7 and 8 to extract the UE-specific reference signal associated with the first UE 104 and second UE 110. The first UE 104 uses the extracted UE-specific reference signals to perform channel estimation for the serving and interfering channel equivalent transfer function, h and g respectively, and ultimately demodulates received signals in a manner that takes into account the equivalent transfer function of the intended communication channel and the equivalent transfer function of the interfering communication channel as well as the interference itself using the above described maximum likelihood demodulator. The associated processing is set out in, and described with reference to, FIG. 4, that is, the above demodulator is arranged to determine two equivalent transfer function estimations; the first being the equivalent transfer function of the intended channel, h, associated with port 7 and the second being the equivalent transfer function of the assumed interfering channel, g, associated with port 8. Therefore, the signal detection is performed by the above demodulator by minimisation of $$\|r-hs-gt\|^2.$$

The above examples may use a number of parameters when determining the channel estimations. For example, where the second eNB 108 communicates a mapping pattern for the resource elements that are causing the interference, or that are associated with the interference, at least one or more of the following parameters can be communicated: number of Cell-specific Reference Signals (CRS) antenna ports, CRS frequency shift, Multimedia Broadcast Single Frequency Network (MBSFN) subframe configuration and PDSCH starting symbol, taken jointly and severally in any and all combinations. Other parameters used can be parameters of the UE-specific reference signals such as physical cell ID, virtual cell ID and scrambling sequence, $n_{SCID}$, taken jointly and severally in any and all combinations. These parameters can be provided to the first eNB 102 using the backhaul link 114 such as, for example, via an X2-AP interface, and signaled by the first eNB 102 to the first UE 104 using a higher layer (e.g. RRC) or a physical layer signaling (e.g. PDCCH or EPDCCH). In a further example, for CRS based transmission modes, at least one of physical cell identity and transmission Precoding-Matrix Indicator (PMI), taken jointly and severally, may be provided to the first UE 104 to facilitate channel estimation corresponding to the interfering signal(s).

Figure 7:
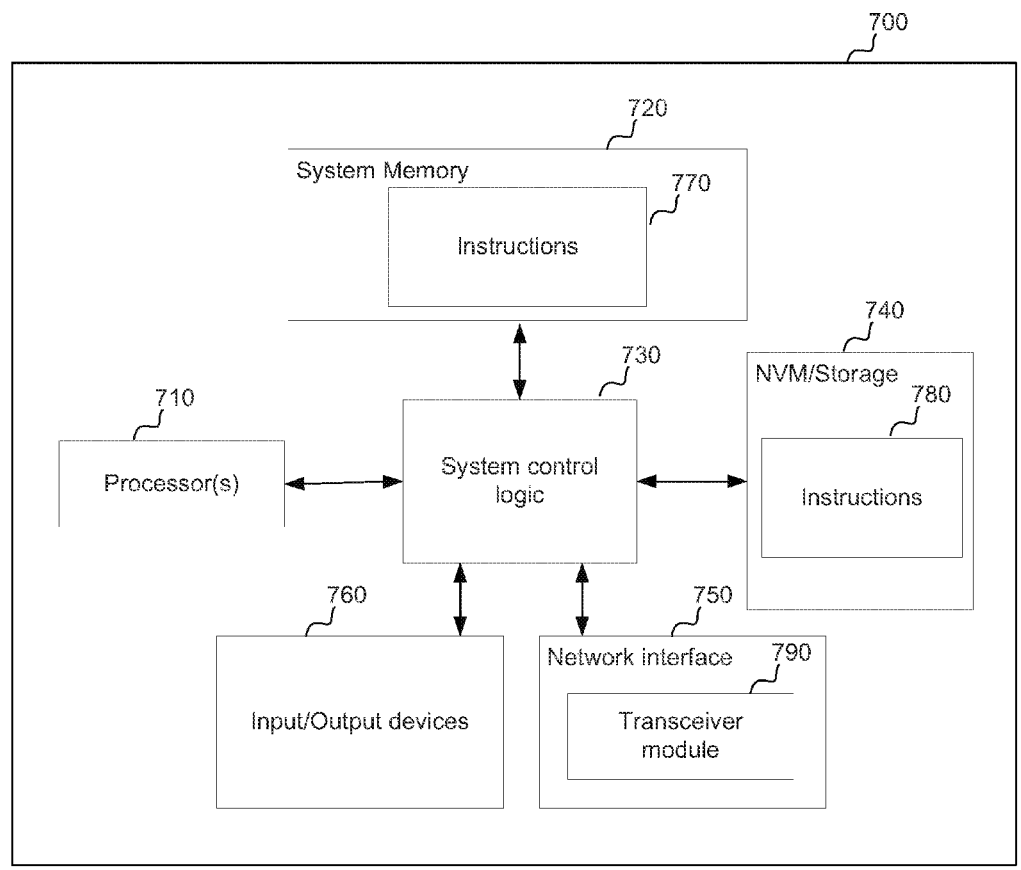
FIGS. 7 and 8 show a UE.

FIG. 7 illustrates, for one embodiment, an example system 700 comprising one or more processor(s) 710, system memory 720, system control logic 720 coupled with at least one of the processor(s) 710, system memory 720, non-volatile memory (NVM)/storage 740, a network interface 750 and Input/Output devices 760. The system 700 is arranged to realise the processing described above and below.

Processor(s) 710 may include one or more single-core or multi-core processors. Processor(s) 710 may include any combination of general-purpose processors and/or dedicated processors (e.g., graphics processors, application processors, baseband processors, etc.). Processors 710 may be operable to carry out the signal processing described herein using suitable instructions or programs (i.e. operate via use of processor or other logic, instructions) 770. The instructions 770 may be stored in system memory 720, as system instructions, or additionally or alternatively may be stored in (NVM)/storage 740, as NVM instructions 780.

The system control logic 730 for one embodiment may include any suitable interface controllers to provide for any suitable interface to at least one of the processor(s) 710 and/or to any suitable device or component in communication with the system control logic 730.

The system control logic 730 for one embodiment may include one or more memory controller(s) to provide an interface to the system memory 720. The system memory 720 may be used to load and store data and/or instructions for system 700. The system memory 720 for one embodiment may include any suitable volatile memory, such as suitable dynamic random access memory (DRAM), for example.

The NVM/storage 740 may include one or more tangible, non-transitory computer-readable media used to store data and/or instructions, for example. The NVM/storage 740 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 740 may include a storage resource physically as a part of a device on which the system 700 is installed or it may be accessible by, but not necessarily a part of, the device. For example, the NVM/storage 740 may be accessed over a network via the network interface 790.

The system memory 720 and the NVM/storage 740 may respectively include, in particular, temporal and persistent copies of, for example, the instructions 770 and 780, respectively. Instructions 770 and 780 may include instructions that when executed by at least one of the processor(s) 710 result in the system 700 implementing a one or more of flow diagrams, methods, examples or embodiments described herein. In some embodiments, instructions 770 and 780, or hardware, firmware, and/or software components thereof, may additionally/alternatively be located in the system control logic 720, the network interface 750, and/or the processor(s) 710.

The network interface 750 may have a transceiver module 790 to provide a radio interface for the system 700 to communicate over one or more network(s) (e.g. wireless communication network) and/or with any other suitable device. The transceiver module 790 may be implement receiver module that performs the above processing of the received signals to realise interference mitigation. In various embodiments, the transceiver module 790 may be integrated with other components of system 700. For example, the transceiver module 790 may include a processor of the processor(s) 710, the memory of the system memory 720, and the NVM/Storage of NVM/Storage 740. The network interface 750 may include any suitable hardware and/or firmware. Network interface 750 may be operatively coupled to a plurality of antennas (not shown) to provide a multiple input, multiple output radio interface. The network interface 750 for one embodiment may include, for example, a network adapter, a wireless network adapter, a telephone modem, and/or a wireless modem.

For one embodiment, at least one of the processor(s) 710 may be packaged together with logic for one or more controller(s) of system control logic 730. For one embodiment, at least one of the processor(s) 710 may be packaged together with logic for one or more controllers of system control logic 730 to form a System in Package (SiP). For one embodiment, at least one of the processor(s) 710 may be integrated on the same die with logic for one or more controller(s) of system control logic 730. For one embodiment, at least one of the processor(s) 710 may be integrated on the same die with logic for one or more controller(s) of system control logic 730 to form a System on Chip (SoC).

Figure 8:
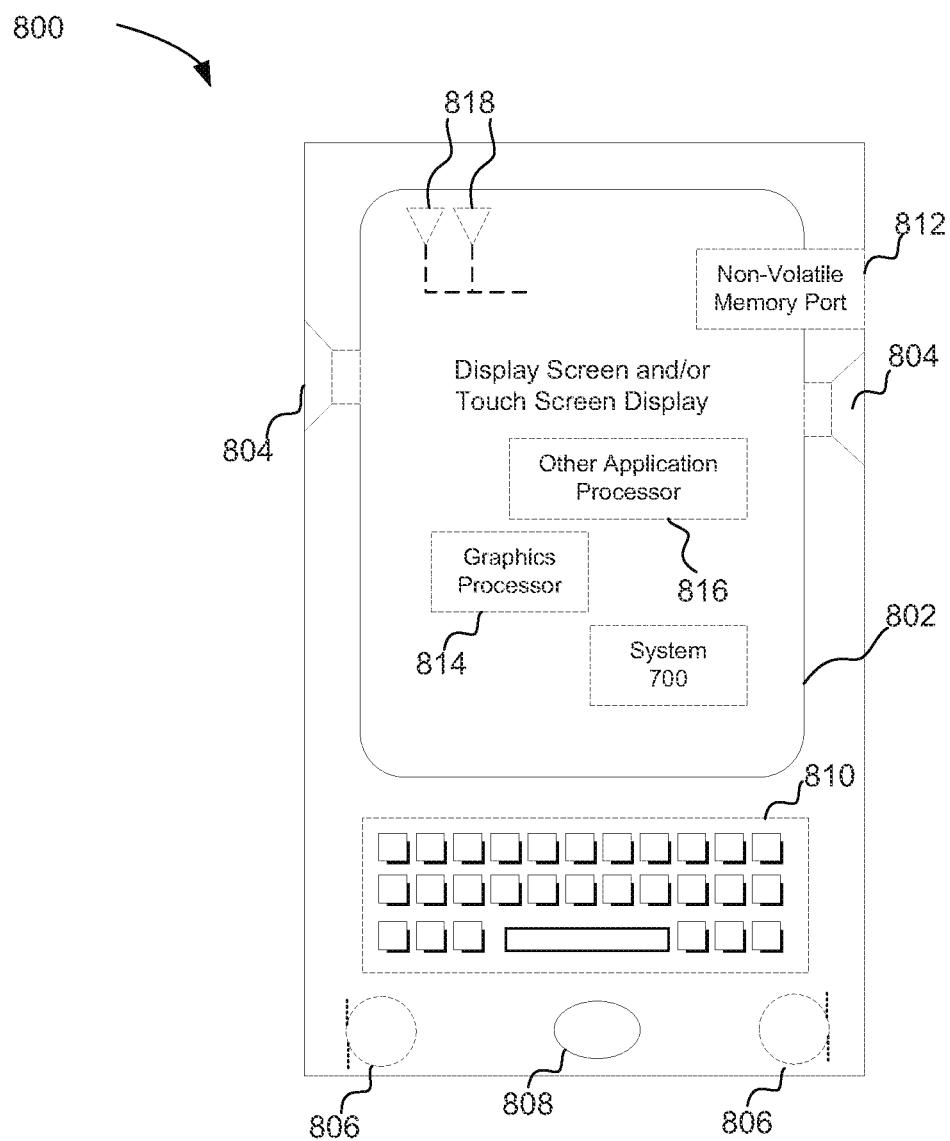

In various embodiments, the I/O devices 760 may include user interfaces designed to enable user interaction with the system 700, peripheral component interfaces designed to enable peripheral component interaction with the system 700, and/or sensors designed to determine environmental conditions and/or location information related to the system 700. FIG. 8 shows an embodiment in which the system 700 is used to realise a UE in form of a mobile device 800.

In various embodiments, the user interfaces could include, but are not limited to, at least one or more of a display 802 (e.g., a liquid crystal display, a touch screen display, etc.), a speaker 804, a microphone 806, one or more cameras 808 (e.g., a still camera and/or a video camera), a flashlight (e.g., a light emitting diode flash), and a keyboard 810, taken jointly and severally in any and all permutations.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 450 to communicate with components of a positioning network, e.g., a global positioning system (GPS) satellite.

In various embodiments, the system 700 may be a mobile computing device such as, but not limited to, a laptop computing device, a tablet computing device, a netbook, a mobile phone, etc. In various embodiments, system 700 may have more or fewer components, and/or different architectures. Additionally, the mobile device 800 may comprise at least one or more of a memory port 812 for receiving additional memory (not shown), a graphics processor 814 and an application processor 816, taken jointly and severally in any and all permutations. The mobile device can comprise one, or more than one, antenna 818.

Figure 9:
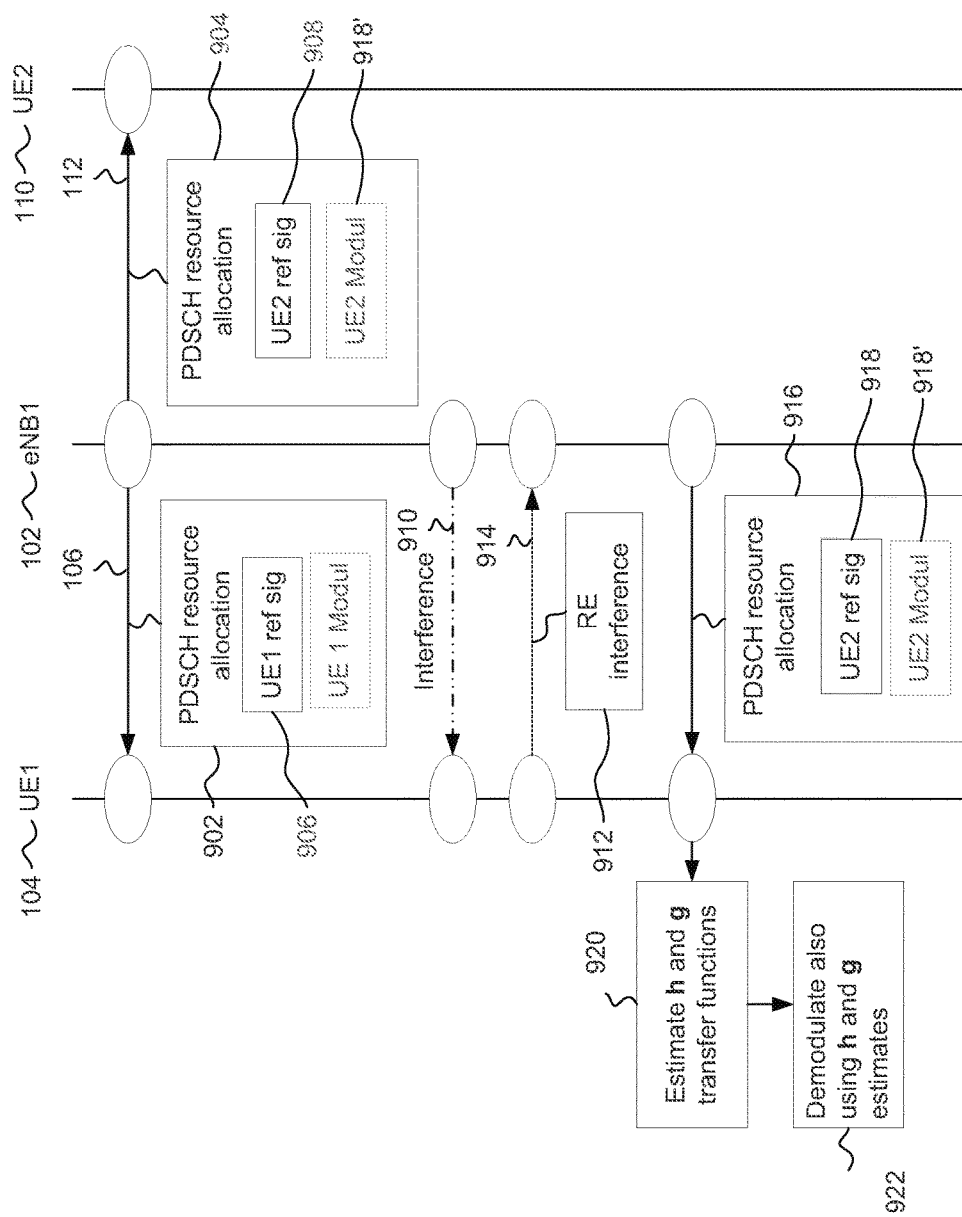
FIG. 9 shows a flow diagram of processing operations associated with interference mitigation.

Referring to FIG. 9, there is shown an intra-cell interference scenario 900 in which the eNB 102 is communicating with two UEs; namely, the first UE 104 and the second UE 110. The eNB 102 allocates respective resources 902 and 904 to the first 104 and second 110 UE. To facilitate correct symbol estimation and demodulation, associated downlink control data has prescribed reference signals 906 and 908 for each UE 104 and 110. The reference signals can be UE-specific reference signals.

It can be appreciated that it is assumed that the eNB 102 transmission 112 to the second UE 110 is interfering with the first UE 104, via interference signal 910. The first UE 104 may optionally inform the eNB 102 of the interference by providing data 912 associated with that interference in a signal 914 to the eNB. The data can take the form of an interference level(s) on the resource elements that are subject to interference. The eNB 102 processes the received data relating to the interference and determines whether or not one of its own transmissions is causing the problem or if the interference originates from another eNB or UE. The eNB 102 in the present example will determine that the source of the interference is the communication 112 with the second user equipment 110. The eNB 102 responds to the received data 912, and subsequent processing, by sending data 916, IMD, for ameliorating the interference to the first UE 104. Examples of the data are indicated above. In the present example, the data 916 comprises the UE-specific reference signal 918 and an indication of the modulation scheme 918'. The first UE 102 receives the data 916 and estimates the transfer functions of the two channels, h, and g, at 920 and uses those estimates to demodulate received signal(s) 106 designated for the first UE 104 at 922.

In the examples described herein, in terms of the signaling of data, such as, for example, downlink control channel information associated with the interfering cell, to the UE that is subject to the interference, for use in estimating the interference channel, that data can comprise at least one or more of the following parameters taken jointly and severally in any and all combinations:

1. Physical Cell ID for the interfering cell, for example, physical cell ID=0 . . . 503. This is used to obtain a cell-specific reference signal unique to the interfering eNB.

2. Number of CRS antenna ports for the interfering cell, for example port=0, 1, 2, 4. This information is used for channel estimation of channels from one or more interfering eNBs and/or to derive one or more PDSCH resource element mapping patterns.

3. Precoding matrix indicator (PMI) of the codebook, which is used for channel estimation associated with interference from an interfering eNB.

4. Modulation information corresponding to an interfering signal.

5. Resource allocation information corresponding to an interfering signal.

6. PDSCH starting symbol for the interfering cell, for example, L=0, 1, 2, 3, 4. For Multicast/Broadcast Single-Frequency Network (MBSFN) subframe, the PDSCH starting symbol can be min(2,L). Alternatively, the PDSCH starting symbol for the interfering cell can be determined by the decoding of a neighbour-cell PCFICH. The starting symbol provides an indication of where the division is between the portion of the subframe corresponding to the PDCCH region and the portion of the subframe corresponding to the PDSCH region. This information is used for channel estimation of the channels from one or more interfering eNBs and/or to derive one or more PDSCH resource element mapping patterns.

7. Control Format Indicator (CFI) value (from PDCCH region) for the interfering cell L=0, 1, 2, 3, 4. For a Multicast/Broadcast Single-Frequency Network subframe, it can be min(2,L). The CFI is obtained from the PCFICH and indicates the instantaneous size of the control region in terms of the number of OFDM symbols in the subframe. Thus the CFI indirectly indicates where in the subframe the data region starts. This essentially gives the same information as the PDSCH starting symbol in list item 3 above but via a different route.

8. Multicast/Broadcast Single-Frequency Network subframe configuration for the interfering cell, which is used to derive one or more PDSCH resource element mapping pattern(s) corresponding to at least one interfering cell.

9. Virtual Cell ID and nSCID of the UE-specific reference signal associated with an interfering cell, such as, for example, virtual Cell ID=0 . . . 503. This is used to obtain a UE-specific reference signal corresponding to the interfering eNB.

These parameters can be provided to the first eNB 102 using, for example, a backhaul link, such as, for example, an X2 interface, and signaled by the first eNB 102 to the first UE 104 using a higher layer signaling such as, for example, the Radio Resource Control (RRC) protocol or physical layer signaling such as, for example, PDCCH or EPDCCH, which signaling is described with reference to FIG. 14. The RRC is described in, for example, TS 36.331 Evolved Universal Radio Access Network (E-UTRA); Radio Resource Control (RRC); Protocol Specification, release 10 or higher.

Figure 10:
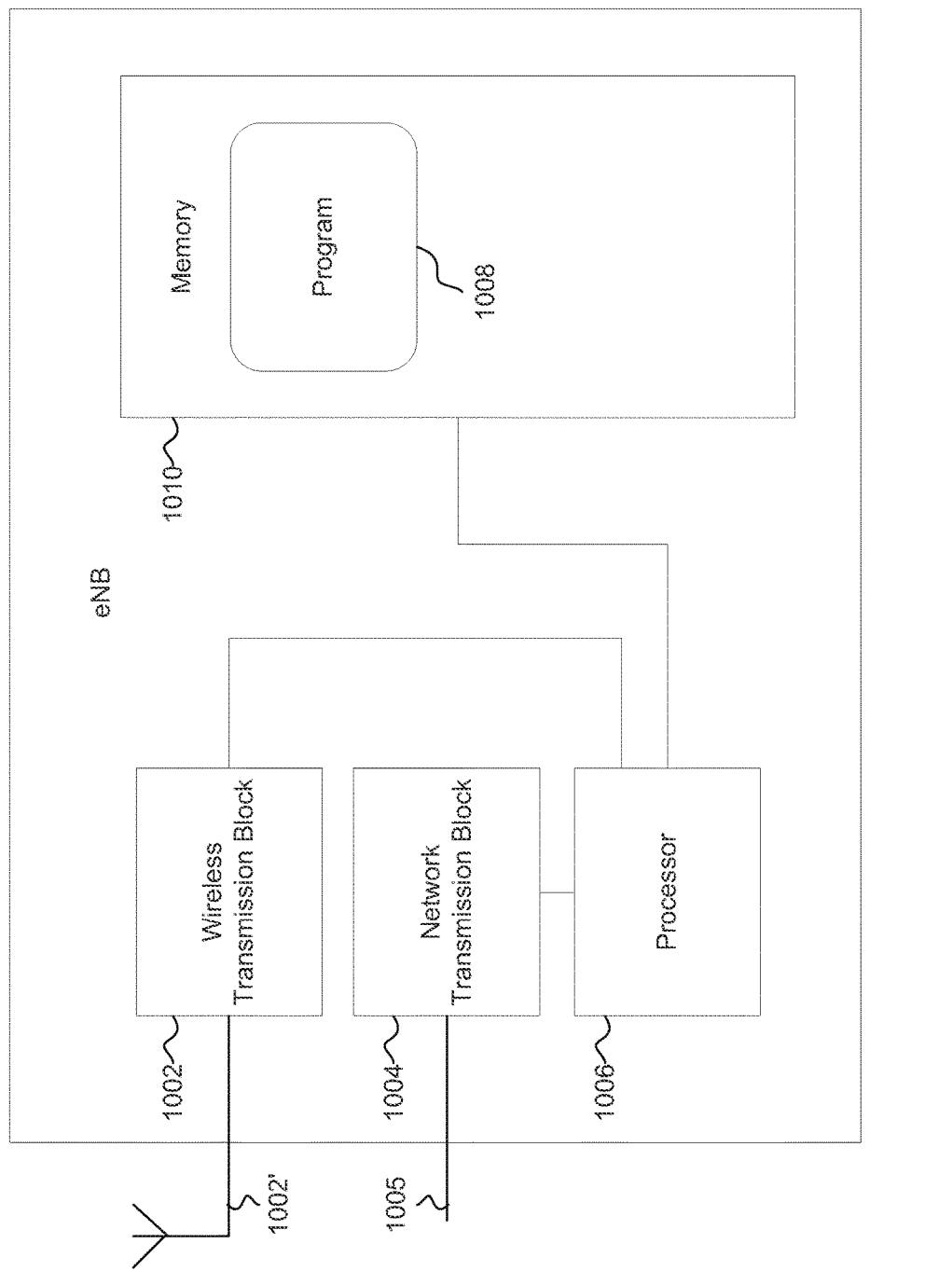
FIG. 10 illustrates an eNodeB for use in mitigating interference.

Referring to FIG. 10, there is shown an embodiment 1000 of an eNB, such as, for example, the first 102 and second 108 eNBs. The eNB comprises a wireless transmission block 1002 for communicating wirelessly with UEs such as, for example, the first and second UEs described above. The transmission block 1002 has an associated antenna 1002' and preferably has a number of antennas for MIMO operation. A network transmission block 1004 is provided, which supports network communications such as, for example, backhaul communications with other eNBs such as the second eNB above, or any other network entity. The eNB 1000 can comprise, therefore, a network connection 1005 such as, for example, the backhaul link described above. A processor 1006 is provided for controlling overall operations of the eNB 1000. The processor 1006 can comprise a number of processors, and/or one or more multi-core processors. The processor 1006 operates in accordance with software 1008 stored within a processor readable, or processor accessible, memory or storage 1010. The software 1008 is arranged so that the eNB 1000 can implement the examples described herein, and, in particular, can implement the eNB aspects of the flowcharts and flow diagrams described herein.

Figure 11:
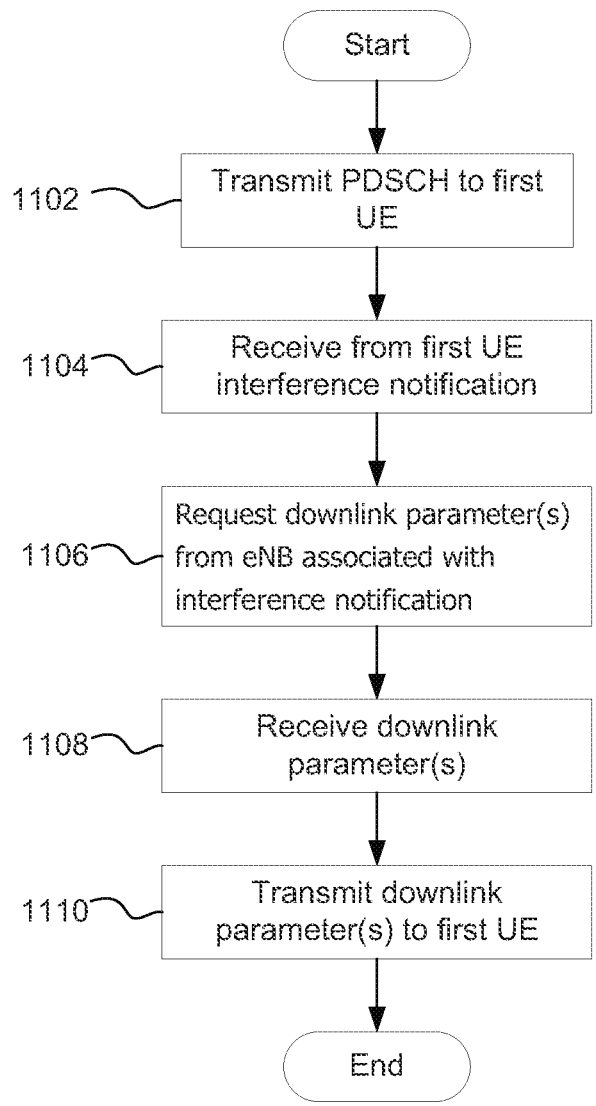
FIGS. 11 to 13 depict flowcharts for interference mitigation.

Referring to FIG. 11, there is shown a flowchart 1100 of operations performed by the eNB 1000. The operations can be used for inter-cell interference mitigation. The eNB 102 transmits or outputs a PDSCH to the first UE 104, at 1102. The eNB 102 receives from the first UE 104 a notification of interference at 1104. The eNB 102 determines the source of the interference and sends, at 1106, a network message to the entity responsible for the interference, that is, the second eNB 108 in the present example, for downlink parameter(s) information associated with the interference, which, in the present example, is the PDSCH and UE-specific or CRS parameters being transmitted to the second UE 110. It will be appreciated that the downlink parameter(s) information is an embodiment of IMD.

At 1108, the eNB 102 receives from the second eNB 108 the requested downlink parameter(s) information for at least mitigating the interference. The first eNB 1110 transmits interference mitigation data such as, for example, data derived from or associated with the downlink parameter(s) information, to the first UE 104 for use in mitigating interference. Examples can be realised in which the parameters can be provided by the first eNB 102 to the first UE 104 using higher layer signaling such as, for example, RRC signaling, or physical layer signaling such as, for example, PDCCH or EPDCCH signaling.

Figure 12:
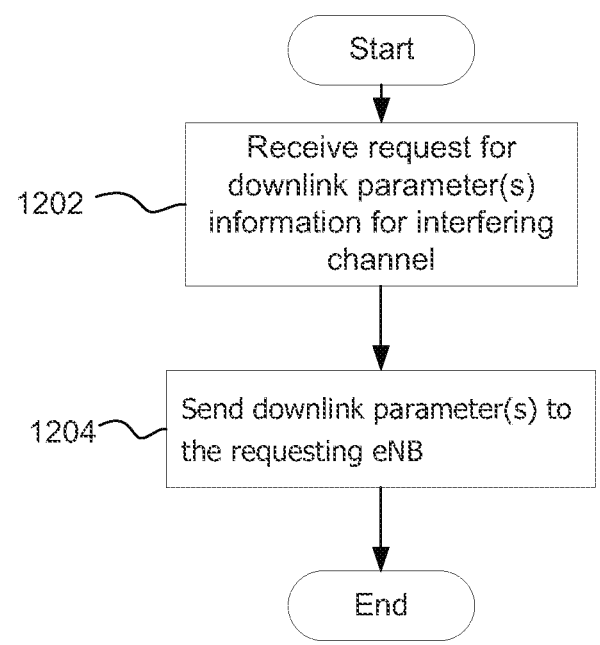

FIG. 12 shows a flowchart 1200 of operations performed by the eNB 1000. The operations can be used for inter-cell interference mitigation. The eNB 1000, such as, for example, the second eNB 108, receives, at 1202, a request for IMD such as, for example, downlink parameter(s) information, relating to a channel transmitted by the eNB 1000 such as, for example, a current PDSCH being transmitted to a respective UE such as, for example, the second UE 110. The eNB 1000 responds to the request by sending a message to the requesting network entity, such as, for example, the first eNB 102, that contains data associated with the downlink parameter(s), that is, the IMD.

Figure 13:
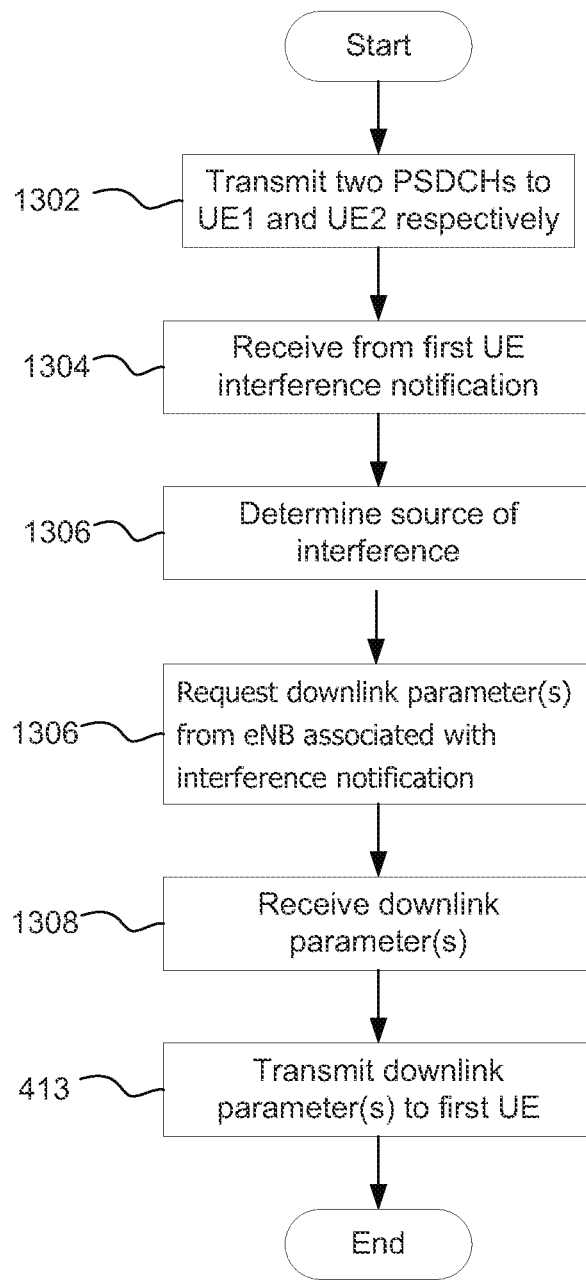

FIG. 13 depicts a flowchart 1300 of processing operations performed by the eNB 1000. The operations can be used for intra-cell interference mitigation. The eNB 1000 can be, for example, at least one of the above first 102 and second 108 eNBs. At 1302, the eNB 1000 transmits on at least two channels such as, for example, two PDSCHs designated for respective UEs. The respective UEs can be, for example, the above first UE 104 and the above second 110 UE. The eNB 1000 receives, at 1304, an notification, from one of the UEs 104 and 110, such as, for example, the first UE 104, containing an indication of interference. The eNB 1000 determines the source of the interference at 1306. The eNB 1000 transmits interference mitigation data such as, for example, data associated with or derived from the downlink parameter(s) information, associated with the source of interference to the UE experiencing the interference for use in interference mitigation as described in any of the above examples.

Embodiments of interference mitigation data comprises data associated with or derived from at least one of: cell-specific reference signal and a UE-specific reference signal associated with the interfering signal a cell identifier; a number of cell-specific reference signal antenna ports and cell-specific reference signal shift of the corresponding transmitter; a PDSCH starting symbol; an MBSFN subframe configuration for the interfering cell; and an interfering cell EPDCCH sets allocation taken jointly and severally in any and all permutation. These parameters can be provided by the first eNB 102 to the first UE 104 using a higher layer such as, for example, RRC, or a physical layer signaling such as, for example, PDCCH or EPDCCH, which signaling is described hereafter.

Figure 14:
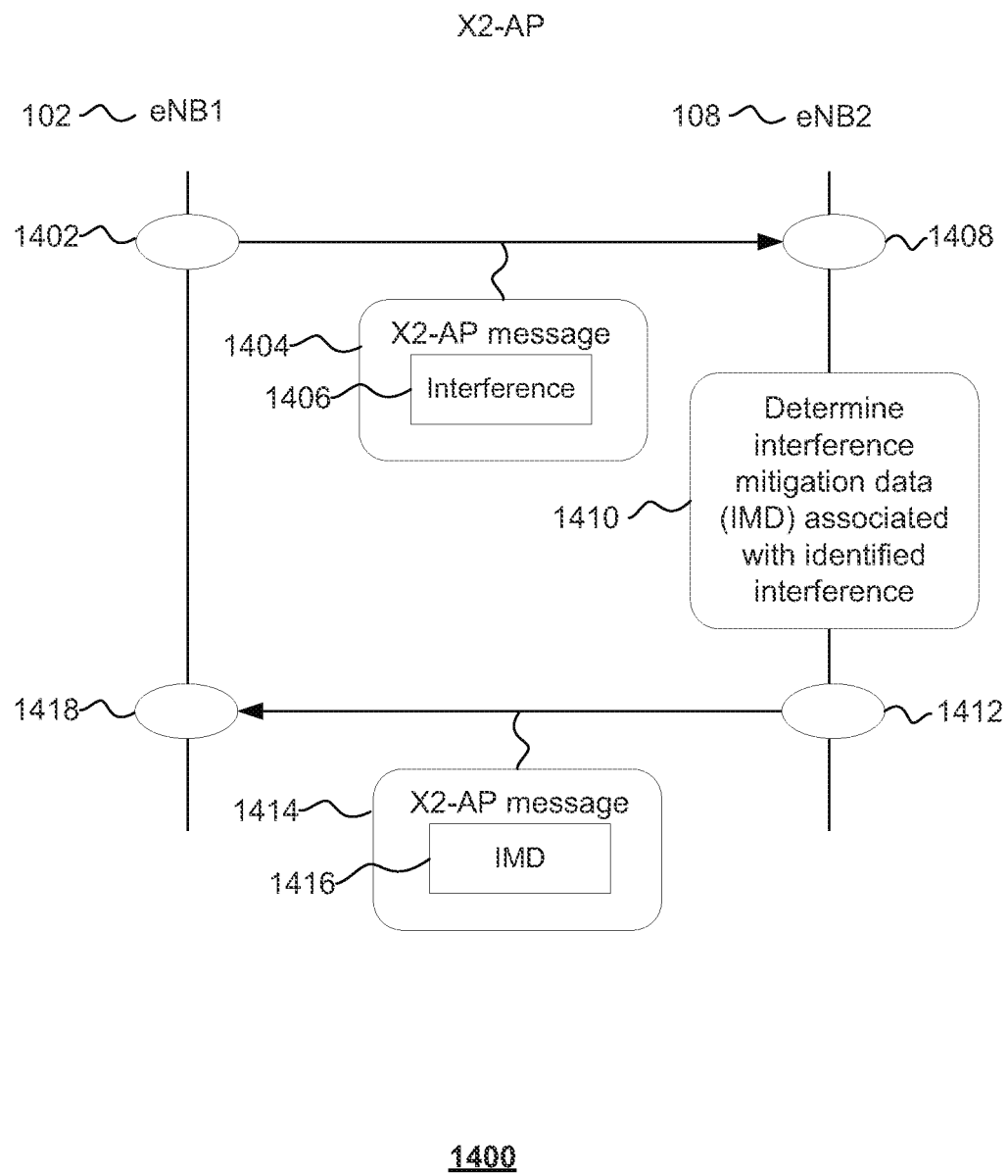
FIG. 14 shows signaling between first and second eNodeBs.

FIG. 14 is a flow diagram 1400 showing, in greater detail, signaling between the first eNB 102 and the second eNB 104 for communicating the interference mitigation data associated with interference experienced by the first eNB 104.

At 1402, the first eNB 102 signals to the second eNB 108 that a respective UE, such as, the first UE 104, is experiencing interference associated with at least one of the second eNB 102 or a UE served by the second eNB 108 such as, for example, the second UE 110. The signal can be conveyed as a message 1404 using a predetermined protocol. Examples can be realised in which the message 1404. Furthermore, the predetermined protocol can be the X2AP protocol, as specified in, for example, 3GPP TS 36.423 (September 2011, Evolved Universal Terrestrial Radio Access Network (E-UTRAN); X2 Application Protocol (X2AP), release 10 or higher. Although the present example shows message 1414 being transmitted from the second eNB 108 to the first eNB 102 in response to notification of interference 1404, examples are not limited to such an arrangement. Examples can be realised in which the message 1414 is proactively distributed or otherwise made available by the second eNB 108 to facilitate interference mitigation.

The message 1404 contains interference data 1406 relating to the interference being experienced. The interference data 1406 can take the form of an Information Element (IE) that requests data associated with at least one of the second eNB 108 and the second UE 110. The requested IE can relate to, for example, UL or DL interference experienced by at least the first UE 104. Additionally, or alternatively, the interference data 1406 can request an IE such as, for example, Radio Resource Status, or other information relating to the allocated radio resources of at least the second UE 110.

The message 1404 is received by the second eNB 108 at 1408. The second eNB 108 processes, at 1410, the received interference data 1406 to determine the source of the interference and to assemble respective interference mitigation data (IMD). At 1412, the second, that is, responding, eNB 108 responds to the requesting eNB 102 by sending the IMD to the requesting eNB 102. Again, examples can be realised in which the response is sent in the form of a message 1414. The message 1414 can be an RRC message. A prescribed protocol, such as, for example, the X2AP protocol can be used to convey the message 1414. It can be appreciated that the message 1414 contains the IMD 1416. The interference mitigation data can take the form of an Information Element. The Information Element can relate to allocated radio resources of at least the second UE 110. An example can be realised in which the IMD comprises a Radio Resources Status IE.

The message 1414 is received at 1418 by the requesting eNB 102 for subsequent processing, such as, for example, extraction of relevant data from the IMD and forwarding the same, or data derived from the IMD, to the UE experiencing the interference.

The above signaling and message exchange has been described with reference to the X2AP protocol. However, examples are not limited to that protocol. Examples can be realised in which a different protocol is used instead.

Figure 15:
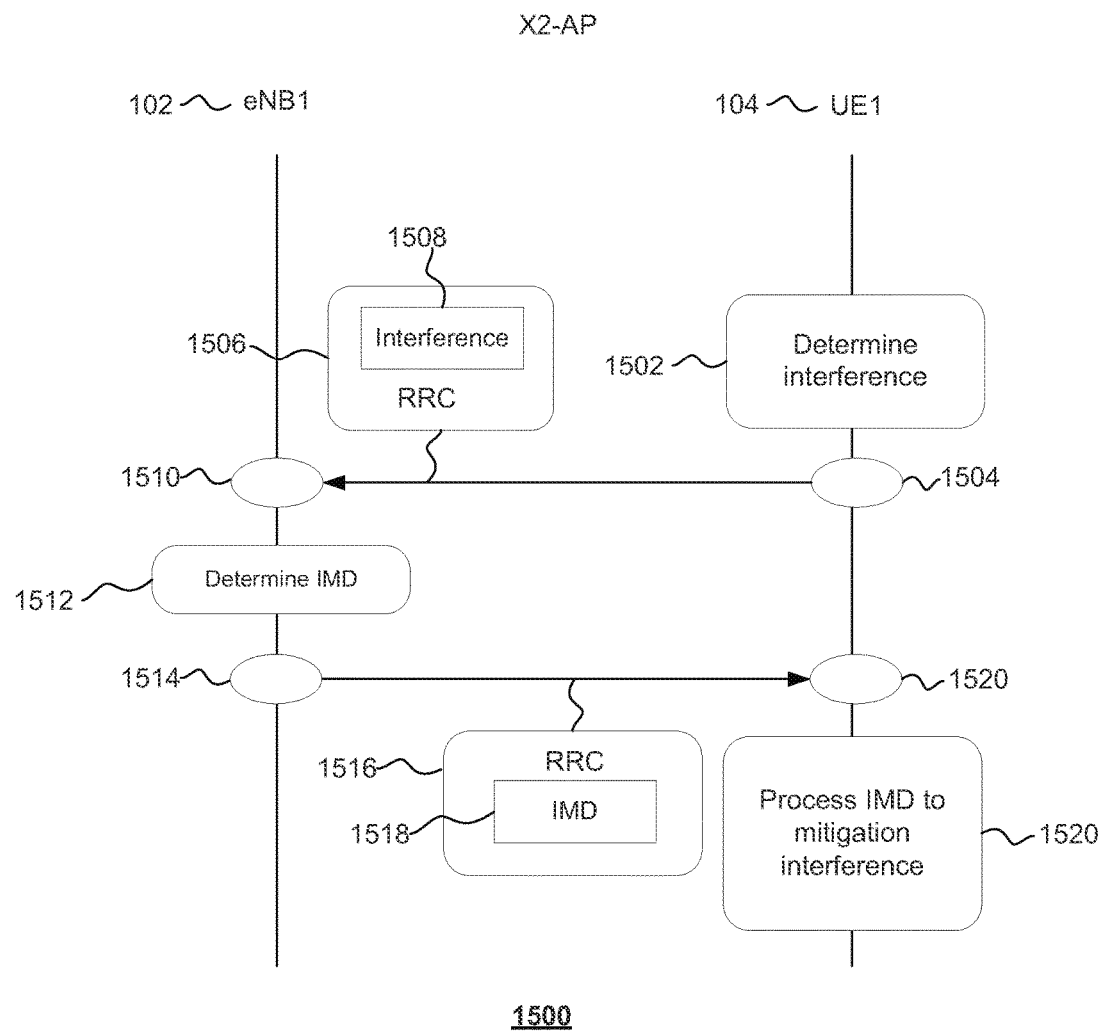
FIG. 15 shows signaling between a first eNodeB and a first UE.

FIG. 15 is a flow diagram 1500 showing, in greater detail, signaling between the first UE 104 and the first eNB 102 requesting IMD or communicating a need for IMD due to determined interference.

At 1502, the first UE 104 determines that it is subject to interference.

The first UE eNB 102 signals, at 1504, the first eNB 102 to indicate that it is experiencing interference. The interference can be associated with at least one of the second eNB 102 or a UE served by the second eNB 108 such as, for example, the second UE 110. The signal can be conveyed as a message 1506 using a predetermined protocol. Examples can be realised in which the message 1506 is an RRC message. Furthermore, the predetermined protocol can be the X2AP protocol, as specified in, for example, 3GPP TS 36.423 (September 2011, Evolved Universal Terrestrial Radio Access Network (E-UTRAN); X2 Application Protocol (X2AP), release 10 or higher. The message 1506 contains interference data 1508 relating to the interference being experienced.

The message 1506 is received by the first eNB 102 at 1510. The first eNB 102 processes, at 1512, the received message 1506 to determine the source of the interference and to assemble respective interference mitigation data (IMD). At 1514, the first eNB 102 responds to the requesting UE 104 by sending a message 1516 to the requesting eNB 102. Again, examples can be realised in which the message 1516 can be an RRC message. The message 1516 contains interference mitigation data 1518.

The message 1516 is received at 1520 by the first UE 104 for subsequent processing, such as, for example, extraction of relevant data from the IMD and mitigation of interference as indicated in any of the above example of interference mitigation.

It will be appreciated that the above described downlink parameter(s), downlink parameter(s) information can be embodiments of interference mitigation data.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or machine readable storage such as, for example, DVD, memory stick or solid state medium. It will be appreciated that the storage devices and storage media are embodiments of non-transitory machine-readable storage that are suitable for storing a program or programs comprising instructions that, when executed, implement embodiments described and claimed herein. Accordingly, embodiments provide machine executable code for implementing a system, device or method as described herein or as claimed herein and machine readable storage storing such a program. Still further, such programs may be conveyed electronically via any medium such as a communication signal carried over a wired or wireless connection and embodiments suitably encompass the same.

Any such hardware can take the form of a processor, suitably programmable, such as for example, a programmable general purpose processor designed for mobile devices, as a FPGA, or an ASIC, which together constitute embodiment of processing circuitry configured or configurable to perform the functions of the above examples and embodiments. Any such hardware can also take the form of a chip or chip set arranged to operate according to any one or more of the above described diagrams, such diagrams and associated descriptions being taken jointly or severally in any and all permutations.

Although the above example and embodiments have been described separately with respect to their accompanying drawings, embodiments are not limited thereto. Embodiments can be realised in which the embodiments or examples associated with the figures can be taken jointly and severally in any and all permutations. For example, the features of FIG. 1, and/or the features of the description of FIG. 1, can be taken together with the features of FIG. 2 or the description of FIG. 2 and so on.

Where variations of examples or embodiments have been presented as being at least member of an enumerated list, either with or without the accompanying language "taken jointly or severally in any and all permutations", it is clear that all permutations of such an enumerated list are contemplated, which is only made more emphatic by the accompanying language "taken jointly and severally in any all permutations".

Embodiments can be realised according to the following clauses:

Clause 1. An apparatus for wireless interference mitigation within a first User Equipment (UE), the apparatus comprising:
at least one channel estimator for estimating a first channel transfer function associated with a first received signal designated for the first UE, and for estimating a second channel transfer function associated with a second received, interference, signal;
at least one symbol estimator, responsive to the at least one channel estimator, to process at least the first received signal to produce a symbol estimation; and
a demodulator, responsive to the channel estimator, operable to demodulate the symbol estimation to an output representing a received data unit corresponding to the symbol estimation; the demodulator comprising a processing unit arranged to demodulate the symbol estimation using the first channel transfer function and the second channel transfer function.

Clause 2. The apparatus of clause 1, in which the processing element is operable to calculate the received data unit using an estimation computation.

Clause 3. The apparatus of clause 2, in which estimation computation is a Maximum Likelihood estimation computation.

Clause 4. The apparatus of any preceding clause, in which at least one channel estimator is responsive to downlink control information comprising a reference signal associated with at least one of the first and second received signals.

Clause 5. The apparatus of clause 4, in which reference signal comprises a UE-specific reference signal associated with at least one of the first and second received signals.

Clause 6. The apparatus of either of clauses 4 and 5, in which downlink control information is associated with the first received signal.

Clause 7. The apparatus of any of clauses 4 to 6, in which the downlink control information is associated with the second received signal.

Clause 8. The apparatus of any of clauses 4 to 7, in which the downlink control information comprises at least one of a UE-specific reference signal parameters Clause 9. The apparatus of clause 8, in which the UE-specific reference signal parameters comprise at least one of a virtual cell identifier of UE-specific RS, a scrambling sequence index (nSCID) and UE-specific antenna ports.

Clause 10. The apparatus of any of clauses 4 to 9, in which the downlink control information comprises at least one CRS parameter.

Clause 11. The apparatus of clause 10, in which the at least one CRS parameter comprises at least one of a physical cell identifier, number of cell-specific reference signals (CRS) antenna ports, and a Multimedia Broadcast Single Frequency Network (MBSFN) subframe configuration.

Clause 12. The apparatus of any of clauses 4 to 11, in which the downlink control information comprises at least one PDSCH resource element mapping parameter.

Clause 13. The apparatus of clause 12, in which the at least one PDSCH resource element mapping parameter comprises at least one of a physical cell identifier, number of cell-specific reference signals (CRS) antenna ports, CRS frequency shift, Multimedia Broadcast Single Frequency Network (MBSFN) subframe configuration, and PDSCH starting symbol and PDSCH resource allocation.

Clause 14. The apparatus of any preceding clause, wherein the at least one symbol estimator comprises symbol processor arranged to produce a set of signal candidates, $\hat{s}(t_i)$, defined as $\hat{s}(t_i)=\text{slice}\{(h^h h)^{-1} h^h (r-g \cdot t_i)\}$, where h is the channel transfer function on a given resource element for the serving channel, g is the channel transfer function on a given resource element for the serving channel, r is the received signal, $t_i$ is an element of the set T of all possible interfering signal candidates and the superscript h represents a Hermitian transpose and the superscript −1 represent the matrix inverse.

Clause 15. The apparatus of clause 14, wherein the demodulator processing unit evaluates $$s = \underset{t_i \in T}{\operatorname{argmin}} \|r - g \cdot t_i - h\hat{s}(t_i)\|^2$$

in producing an output representing the received data unit.

Clause 16. An eNB for wireless interference mitigation, the eNB comprising an input module for receiving downlink data associated with a UE not served by the eNB; the downlink data specifying downlink parameters associated with a channel of the UE; an output module for outputting interference mitigation data associated with the downlink data for transmission to a UE equipment that is served by the eNB; said UE having experienced interference associated with the channel.

Clause 17. An eNB for wireless interference mitigation, the eNB comprising an input module for receiving an indication of interference experienced by a UE served by the eNB;
a processor for determining the source of the interference using the indication of interference;
an output module for transmitting a request for downlink data associated with a UE associated with a channel that is the source of the interference.

Clause 18. An eNB of either of clauses 16 and 17, wherein at least one of the downlink data and interference mitigation data comprises data associated with at least one of: cell-specific reference signal, PDSCH resource element mapping and a UE-specific reference signal associated with the interfering signal.

Clause 19. An eNB of clause 18, in which the UE-specific reference signal associated with the interfering signal comprises at least one of a virtual cell identifier of UE-specific RS, a scrambling sequence index ($n_{SCID}$) and UE-specific antenna ports.

Clause 20. An eNB of either of clauses 17 or 18, in which the downlink data comprises at least one CRS parameter.

Clause 21. An eNB of clause 20, in which the at least one CRS parameter comprises at least one of a physical cell identifier, number of cell-specific reference signals (CRS) antenna ports, and a Multimedia Broadcast Single Frequency Network (MBSFN) sub frame configuration.

Clause 22. An eNB of clause 17, in which the downlink control information comprises at least one PDSCH resource element mapping parameter.

Clause 23. An eNB of clause 22, in which the at least one PDSCH resource element mapping parameter comprises at least one of a physical cell identifier, number of cell-specific reference signals (CRS) antenna ports, CRS frequency shift, Multimedia Broadcast Single Frequency Network (MBSFN) subframe configuration, and PDSCH starting symbol and PDSCH resource allocation.

Clause 24. A method of wireless interference mitigation; the method comprising
receiving resource allocation data associated with an interfering UE to an interfered with UE;
processing a reference signal of the interfering UE identifiable from the received resource allocation data to derive interfering channel data;
processing a reference signal of the interfered with UE to derive intended channel data;
mitigating interference from the interfering UE by demodulating a received signal designated for the interfered with UE using the interfering channel data and the intended channel data.

Clause 25. A method of wireless interference mitigation; the method comprising
receiving via a first antenna port, resource allocation data associated with a UE;
processing a reference signal designated for the UE; the reference signal being determinable from the received resource allocation data to derive interfering channel data;
receiving via a second antenna port, further resource allocation data associated with the UE;
processing a reference signal designated for the UE; the reference signal being determinable from the received resource allocation data to derive intended channel data;
mitigating interference from at the UE by demodulating a received signal designated for the UE using the interfering channel data and the intended channel data.

Clause 26. A method of either of clauses 24 and 25, in which the interfering channel data comprises a transfer function associated with the interfering channel.

Clause 27. A method of any of clauses 24 to 26, in which the intended channel data comprises a transfer function associated with the intended channel.

Clause 28. A eNB for interference mitigation signaling, the eNB comprising
a processor arranged to process interference data associated with a message received from a UE; the message containing an indication that the UE is subject to interference;
the processing being further arranged to determine interference mitigation data and produce a message relating to the interference mitigation data for communication to the UE.

Clause 29. An eNB of clause 28, in which the message is associated with a Radio Resource Control Protocol.

Clause 30. A eNB for interference mitigation signaling, the eNB comprising
a processor, responsive to having processed interference data associated with a message received from a UE; the message containing an indication that the UE is subject to interference, to produce a message requesting interference mitigation data from a further eNB;
the processing being further arranged to process interference mitigation data received from the further eNB to produce a message relating to the interference mitigation data for communication to the UE.

Clause 31. An eNB for interference mitigation signaling, the eNB comprising: a processor arranged to produce interference mitigation data for use in mitigating interference, the processor being further arranged to influence transmission of a message, relating to the interference mitigation data, to a further eNB.

Clause 32. An eNB for interference mitigation signaling, the eNB comprising a processor arranged to receive interference mitigation data for use in mitigation interference; the interference mitigation data being associated with a further eNB.

Clause 33. An eNB of any of clauses 30 to 32, which the message is associated with a X2 application protocol.

Clause 34. A non-transitory machine readable storage storing program instructions configured such that when executed by a processor implement a method, apparatus, UE or eNB as claimed in any preceding claim.

Clause 35. An apparatus, UE, method, eNB substantially as described herein with reference to and/or as illustrated in any one or more of the accompanying drawings.

Clause 36. An apparatus comprising means to implement a method as claimed in any preceding method claim.

The invention claimed is:

1. An apparatus for wireless interference mitigation within a first User Equipment (UE), the apparatus comprising:
at least one channel estimator to estimate a first channel transfer function associated with a first received signal designated for the first UE, and to estimate a second channel transfer function associated with a second received, interference, signal based on information provided to the apparatus from a network about a reference signal associated with the second received signal, wherein the reference signal is a UE-specific reference signal or a cell-specific reference signal;
at least one symbol estimator, responsive to the at least one channel estimator, to process at least the first received signal to produce a symbol estimation; and
a demodulator, responsive to the channel estimator, operable to demodulate the symbol estimation to produce an output representing a received data unit corresponding to the symbol estimation; the demodulator comprising a processing unit arranged to demodulate the symbol estimation using the first channel transfer function and the second channel transfer function,
wherein the at least one symbol estimator comprises a symbol processor arranged to produce a set of signal candidates, $\hat{s}(t_i)$, defined as $\hat{s}(t_i)=\text{slice}\{(h^h h)^{-1} h^h (r-g \cdot t_i)\}$, where h is the channel transfer function on a given resource element for a serving channel, g is the channel transfer function on a given resource element for the serving channel, r is the received signal, $t_i$ is an element of a set T of all possible interfering signal candidates, the superscript h represents a Hermitian transpose, and the superscript −1 represents a matrix inverse.

2. The apparatus of claim 1, in which the processing unit is operable to calculate the received data unit using an estimation computation.

3. The apparatus of claim 2, in which the estimation computation is a Maximum Likelihood estimation computation.

4. The apparatus of claim 1, wherein the information provided to the apparatus from the network about the reference signal is provided in downlink control information.

5. The apparatus of claim 1, in which the reference signal comprises a UE-specific reference signal.

6. The apparatus of claim 4, in which the downlink control information is further associated with the first received signal.

7. The apparatus of claim 4, in which the downlink control information comprises a UE-specific reference signal parameter.

8. The apparatus of claim 7, in which the UE-specific reference signal (RS) parameter comprises a virtual cell identifier of UE-specific RS, a scrambling sequence index (nSCID), or UE-specific antenna ports.

9. The apparatus of claim 4, in which the downlink control information comprises a cell-specific reference signal (CRS) parameter.

10. The apparatus of claim 9, in which the CRS parameter comprises at least one of a physical cell identifier, number of CRS antenna ports, and a Multimedia Broadcast Single Frequency Network (MBSFN) subframe configuration.

11. The apparatus of claim 4, in which the downlink control information comprises at least one physical downlink shared channel (PDSCH) resource element mapping parameter.

12. The apparatus of claim 11, in which the at least one PDSCH resource element mapping parameter comprises a physical cell identifier, number of cell-specific reference signals (CRS) antenna ports, CRS frequency shift, Multimedia Broadcast Single Frequency Network (MBSFN) subframe configuration, or a PDSCH starting symbol and PDSCH resource allocation.

13. An apparatus for wireless interference mitigation within a first User Equipment (UE), the apparatus comprising:
at least one channel estimator for estimating a first channel transfer function associated with a first received signal designated for the first UE, and for estimating a second channel transfer function associated with a second received, interference, signal;
at least one symbol estimator, responsive to the at least one channel estimator, to process at least the first received signal to produce a symbol estimation; and
a demodulator, responsive to the channel estimator, operable to demodulate the symbol estimation to produce an output representing a received data unit corresponding to the symbol estimation; the demodulator comprising a processing unit arranged to demodulate the symbol estimation using the first channel transfer function and the second channel transfer function,
wherein the at least one symbol estimator comprises a symbol processor arranged to produce a set of signal candidates, $\hat{s}(t_i)$, defined as $\hat{s}(t_i)=\text{slice}\{(h^h h)^{-1} h^h (r-g \cdot t_i)\}$, where h is the channel transfer function on a given resource element for a serving channel, g is the channel transfer function on a given resource element for the serving channel, r is the received signal, $t_i$ is an element of a set T of all possible interfering signal candidates, the superscript h represents a Hermitian transpose, and the superscript −1 represents a matrix inverse.

14. The apparatus of claim 13, wherein the demodulator processing unit evaluates $$s = \underset{t_i \in T}{\operatorname{argmin}} \|r - g \cdot t_i - h\hat{s}(t_i)\|^2 \qquad 5$$

in producing the output representing the received data unit.

* * * * *